US011636312B2

(12) United States Patent
Parameswaran et al.

(10) Patent No.: US 11,636,312 B2
(45) Date of Patent: Apr. 25, 2023

(54) SYSTEMS AND METHODS FOR RAPID DEVELOPMENT OF OBJECT DETECTOR MODELS

(71) Applicant: PERCIPIENT.AI INC., Santa Clara, CA (US)

(72) Inventors: Vasudev Parameswaran, Fremont, CA (US); Atul Kanaujia, San Jose, CA (US); Simon Chen, Pleasanton, CA (US); Jerome Berclaz, San Jose, CA (US); Ivan Kovtun, San Jose, CA (US); Alison Higuera, San Josae, CA (US); Vidyadayini Talapady, Sunnyvale, CA (US); Derek Young, Carbondale, CO (US); Balan Ayyar, Oakton, VA (US); Rajendra Shah, Cupertino, CA (US); Timo Pylvanainen, Menlo Park, CA (US)

(73) Assignee: PERCIPIENT.AI INC., Santa Clara, CA (US)

( * ) Notice: Subject to any disclaimer, the term of this patent is extended or adjusted under 35 U.S.C. 154(b) by 0 days.

(21) Appl. No.: 17/938,042

(22) Filed: Oct. 4, 2022

(65) Prior Publication Data

US 2023/0023164 A1 Jan. 26, 2023

Related U.S. Application Data

(63) Continuation-in-part of application No. 17/866,389, filed on Jul. 15, 2022, and a continuation-in-part of (Continued)

(51) Int. Cl.

*G06K 9/00* (2022.01)
*G06N 3/045* (2023.01)

(Continued)

(52) U.S. Cl.

CPC ............ *G06N 3/045* (2023.01); *G06V 10/72* (2022.01); *G06V 10/7753* (2022.01); *G06V 10/82* (2022.01)

(58) Field of Classification Search

CPC .... G06N 3/045; G06V 10/72; G06V 10/7753; G06V 10/82; G06V 10/778

See application file for complete search history.

(56) References Cited

U.S. PATENT DOCUMENTS

2022/0121839 A1* 4/2022 Tagra ...................... G06T 5/005
2023/0023164 A1* 1/2023 Parameswaran ..... G06V 10/778

OTHER PUBLICATIONS

Luo, Dazhi, et al. "Deep-learning-based face detection using iterative bounding-box regression." Multimedia Tools and Applications 77 (2018): 24663-24680. (Year: 2018).*

* cited by examiner

*Primary Examiner* — Andrew M Moyer
(74) *Attorney, Agent, or Firm* — James E. Eakin

(57) ABSTRACT

A computer vision system configured for detection and recognition of objects in video and still imagery in a live or historical setting uses a teacher-student object detector training approach to yield a merged student model capable of detecting all of the classes of objects any of the teacher models is trained to detect. Further, training is simplified by providing an iterative training process wherein a relatively small number of images is labeled manually as initial training data, after which an iterated model cooperates with a machine-assisted labeling process and an active learning process where detector model accuracy improves with each iteration, yielding improved computational efficiency. Further, synthetic data is generated by which an object of interest can be placed in a variety of setting sufficient to (Continued)

permit training of models. A user interface guides the operator in the construction of a custom model capable of detecting a new object.

28 Claims, 16 Drawing Sheets

Related U.S. Application Data application No. 17/866,396, filed on Jul. 15, 2022, and a continuation-in-part of application No. 16/120,128, filed on Aug. 31, 2018.

(60) Provisional application No. 63/337,595, filed on May 2, 2022, provisional application No. 63/329,327, filed on Apr. 8, 2022, provisional application No. 62/553,725, filed on Sep. 1, 2017.

(51) Int. Cl.

| | |
|---|---|
| ***G06V 10/82*** | (2022.01) |
| ***G06V 10/774*** | (2022.01) |
| ***G06V 10/72*** | (2022.01) |

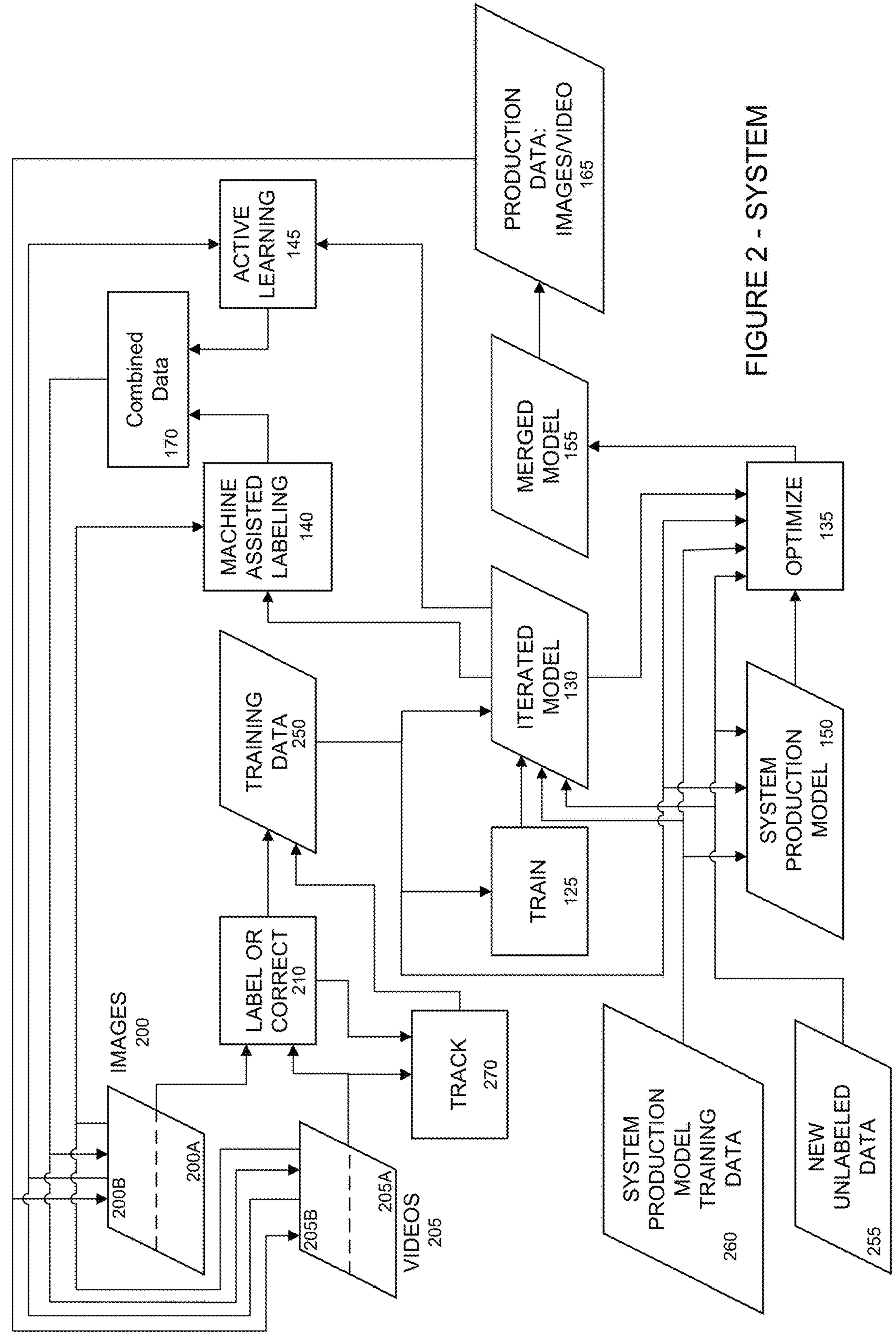
FIGURE 2 - SYSTEM

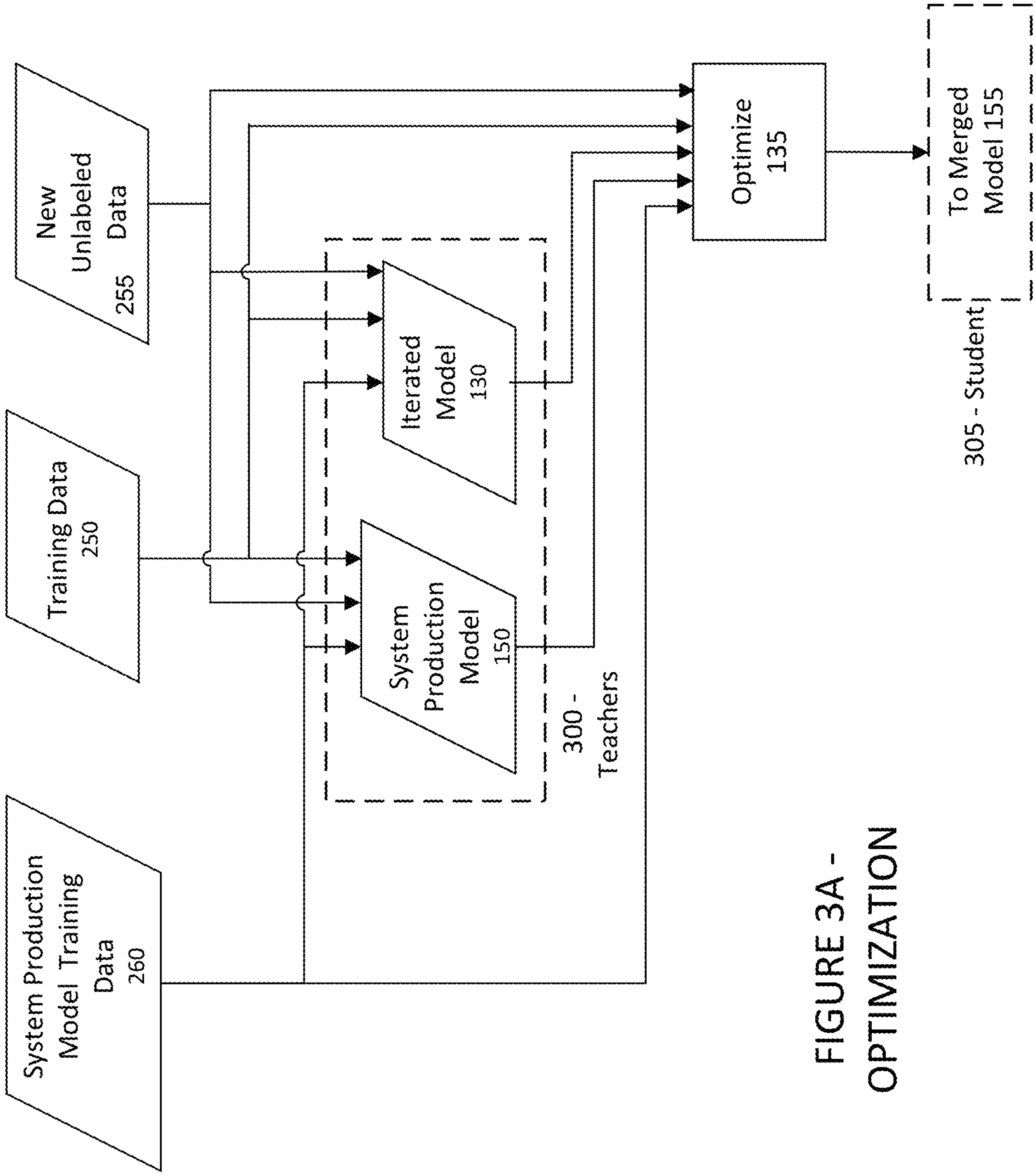
FIGURE 3A - OPTIMIZATION

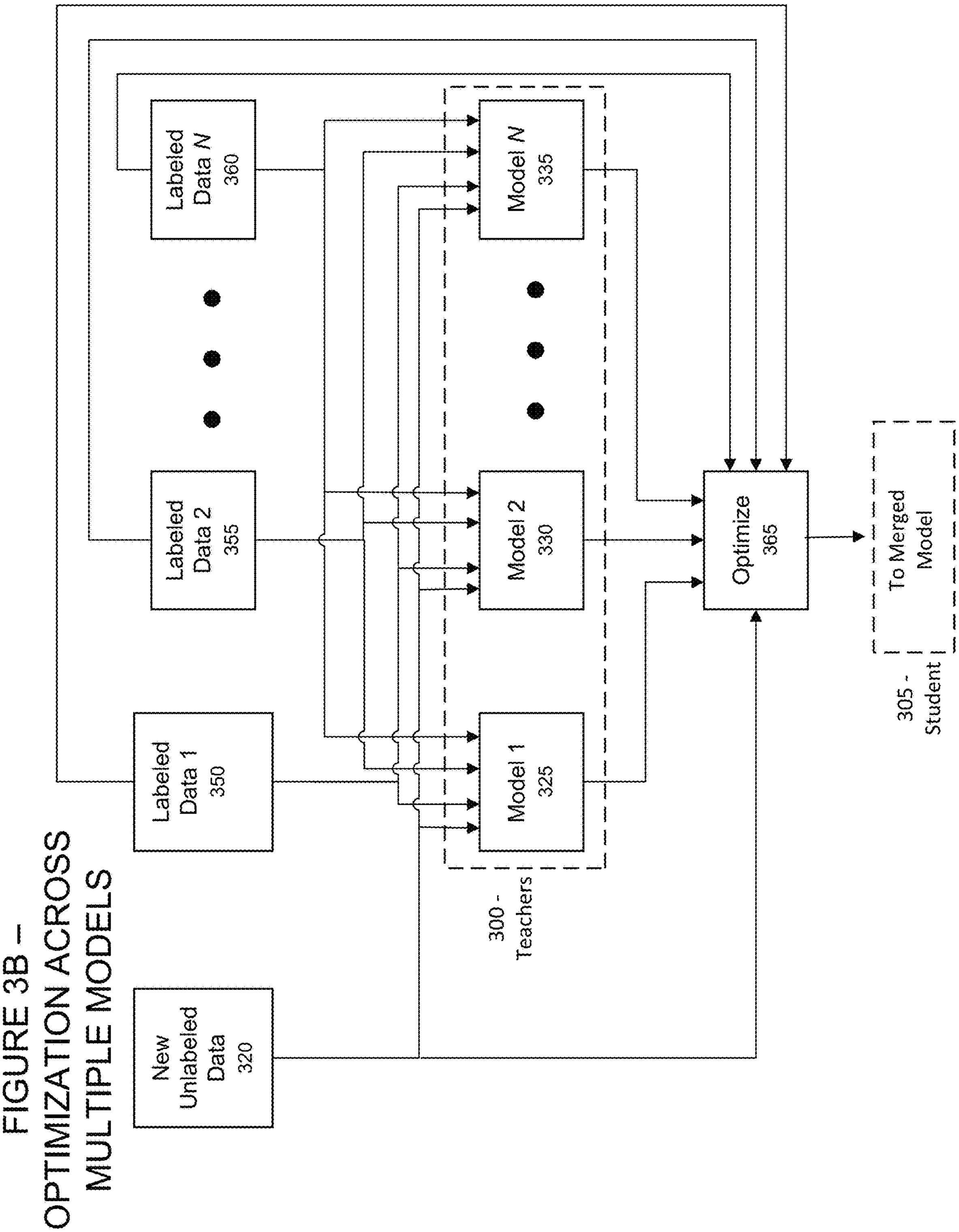
FIGURE 3B – OPTIMIZATION ACROSS MULTIPLE MODELS

FIGURE 4 – ACTIVE LEARNING
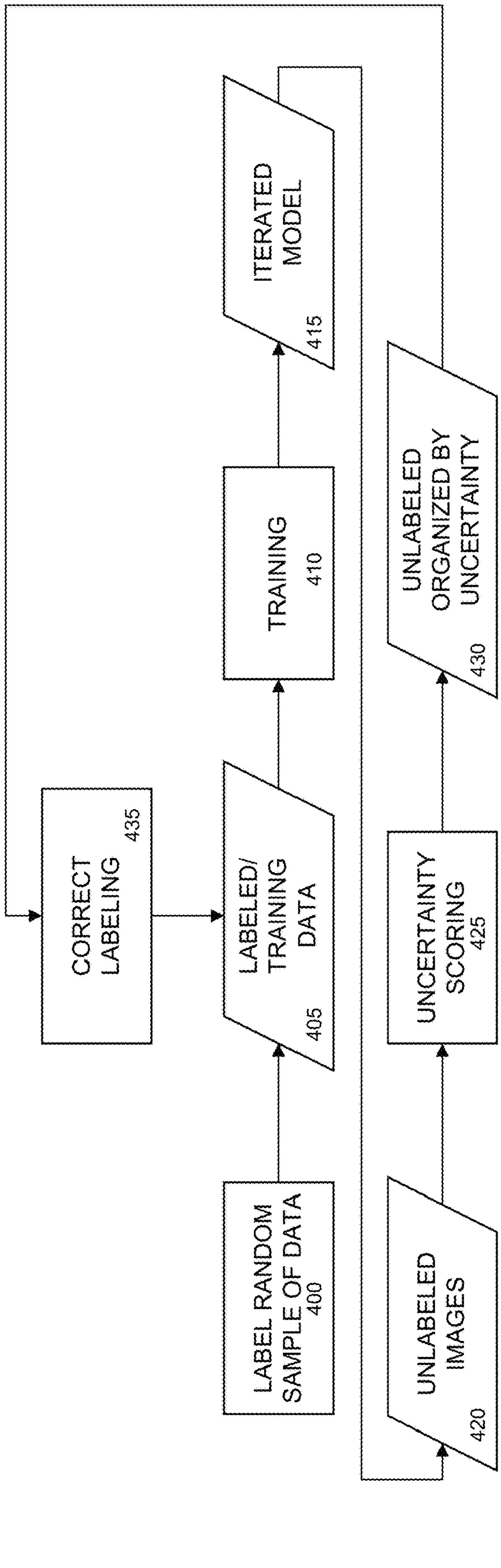

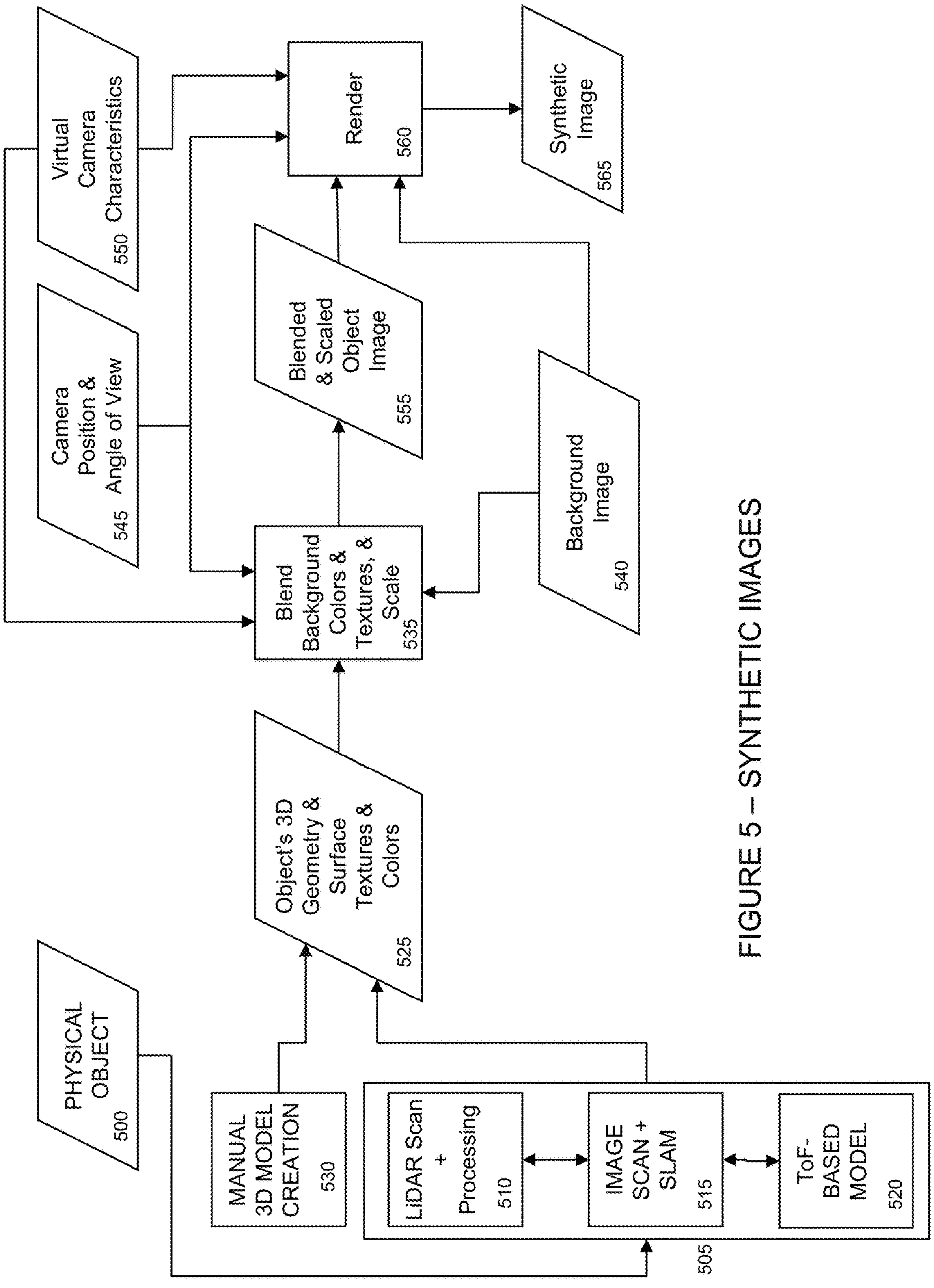
FIGURE 5 – SYNTHETIC IMAGES

Figure 8 – Production System
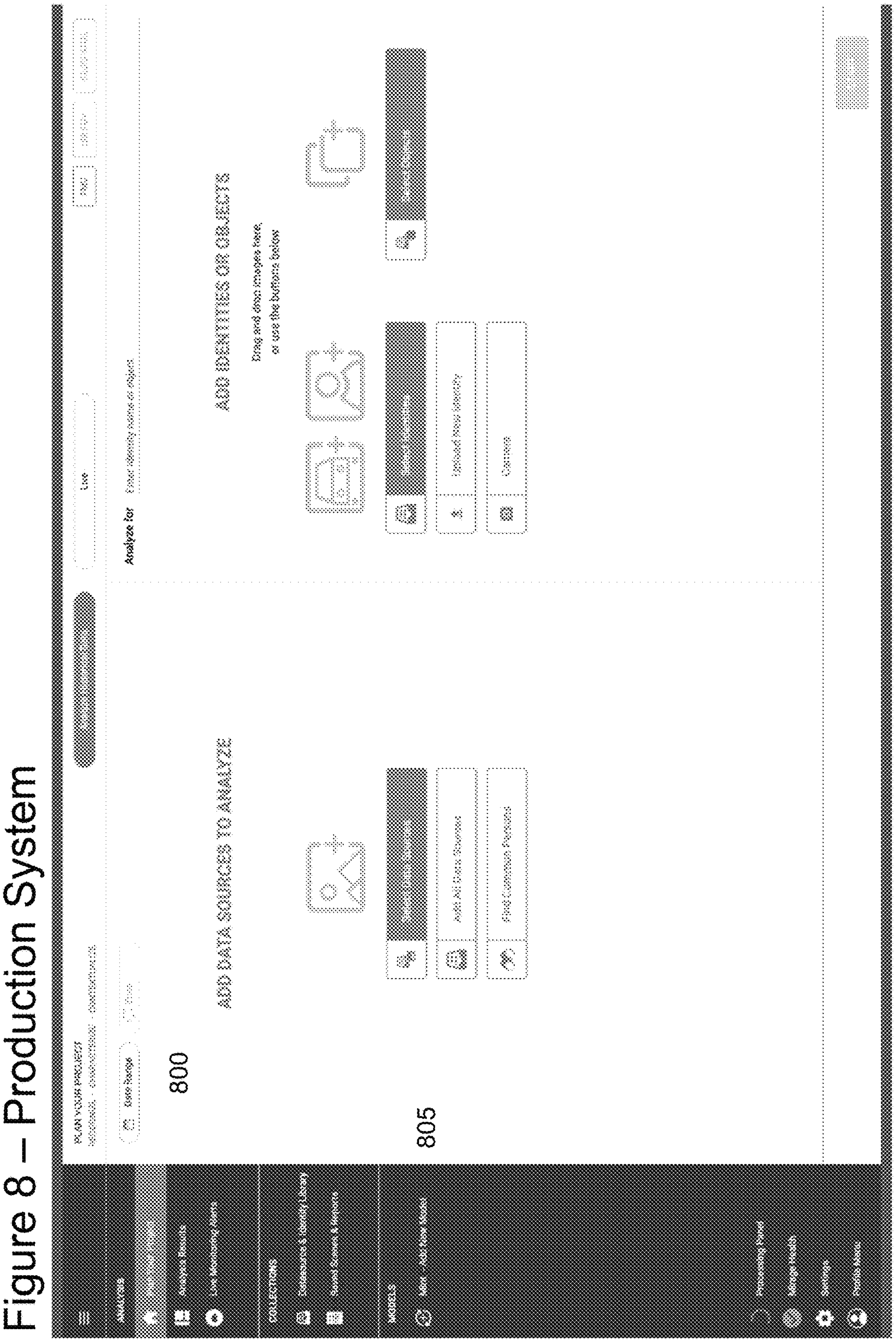

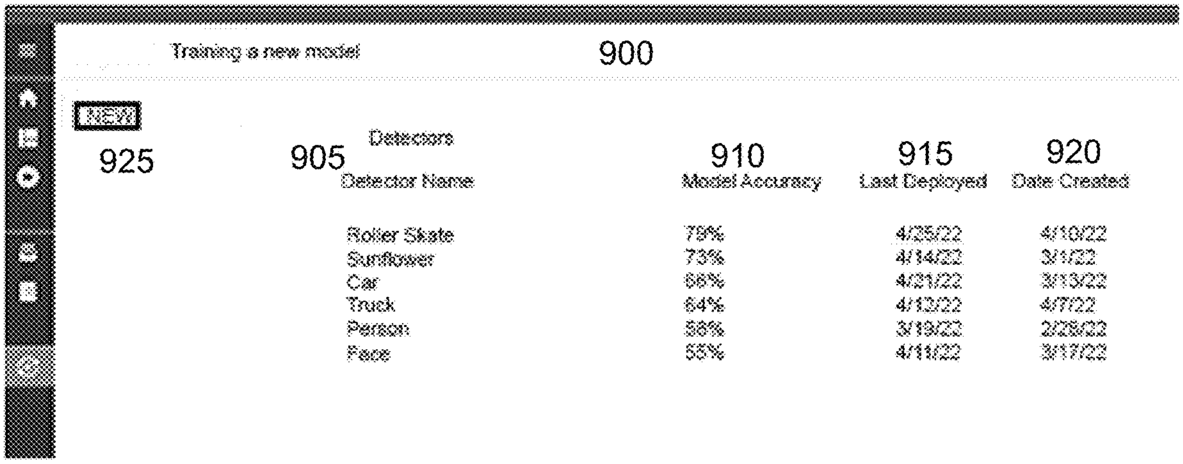
Figure 9A – CREATE CUSTOM MODEL
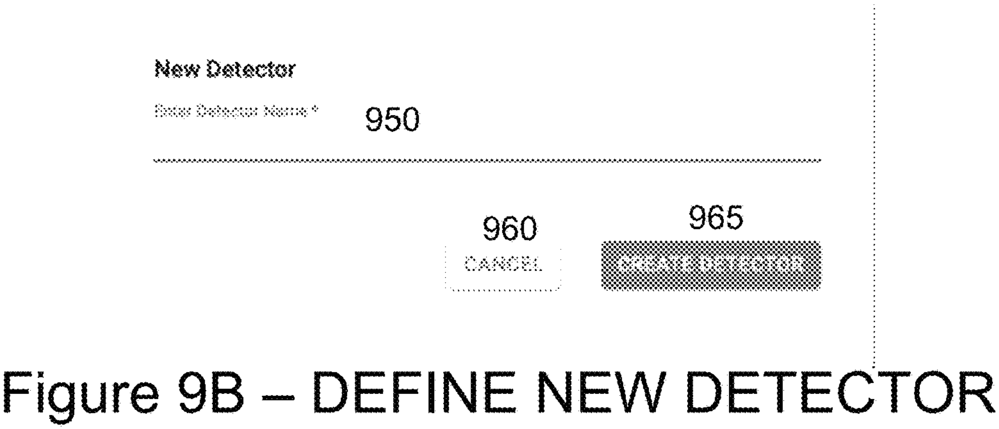
Figure 9B – DEFINE NEW DETECTOR Figure 10
ADD
IMAGE
SET
Figure 11A – DEFINE NEW OBJECT
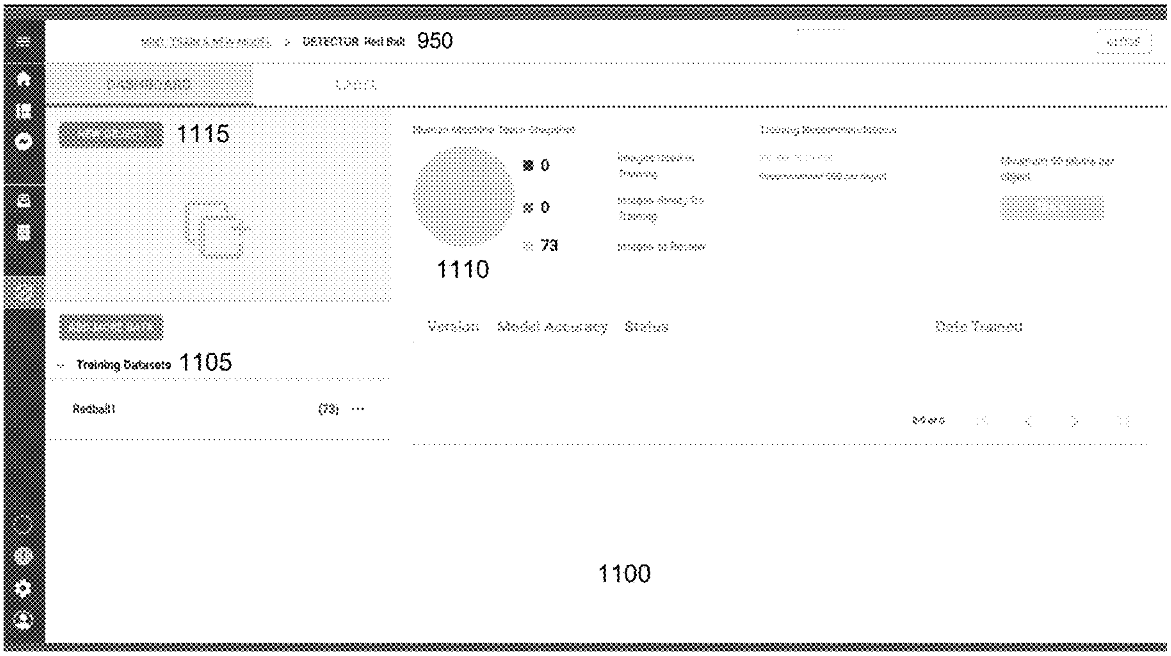

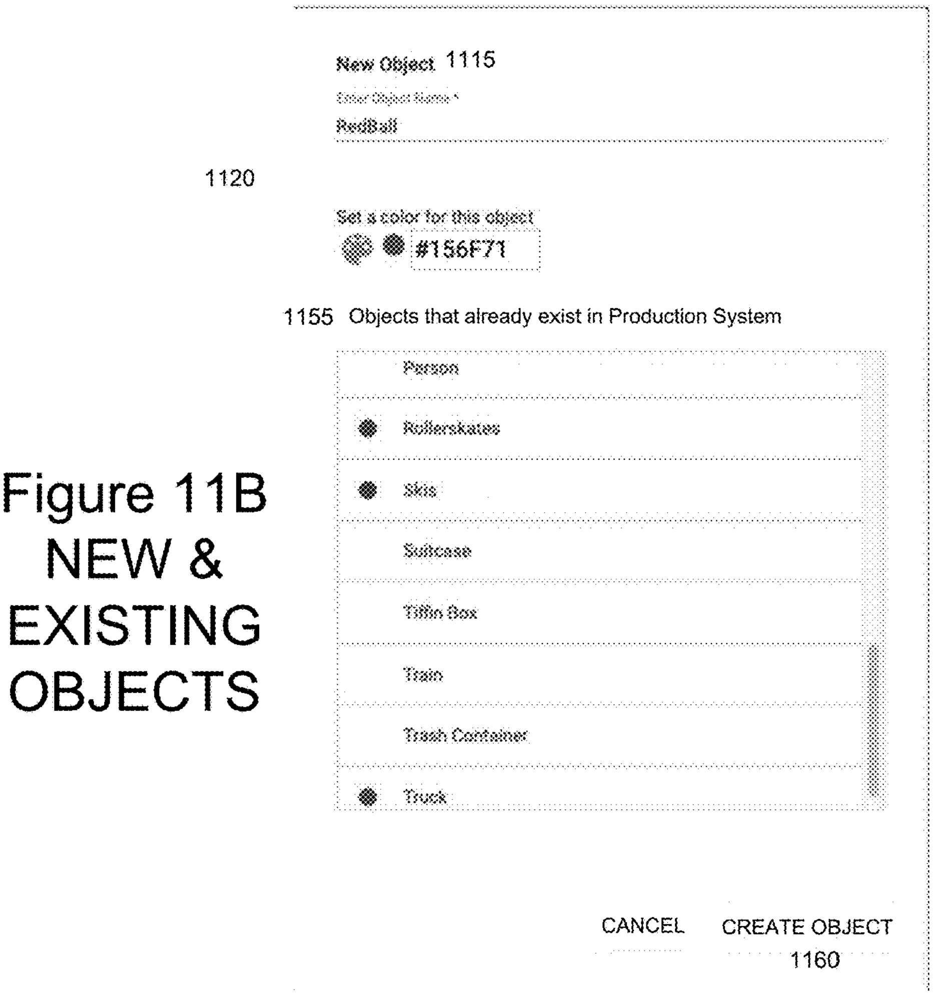
Figure 11B NEW & EXISTING OBJECTS
Figure 12A – START LABEL
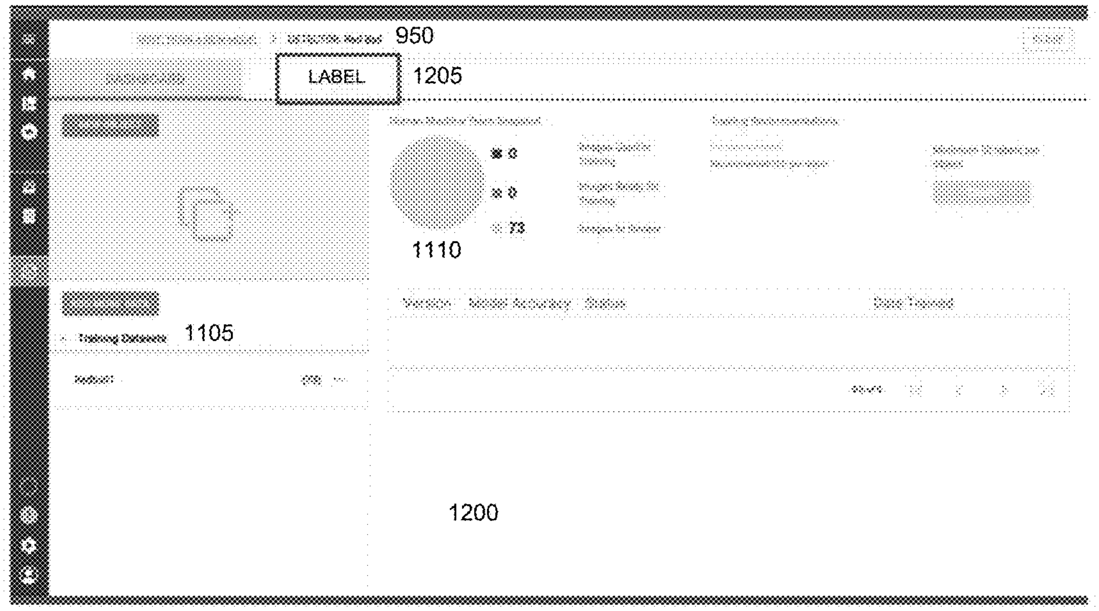

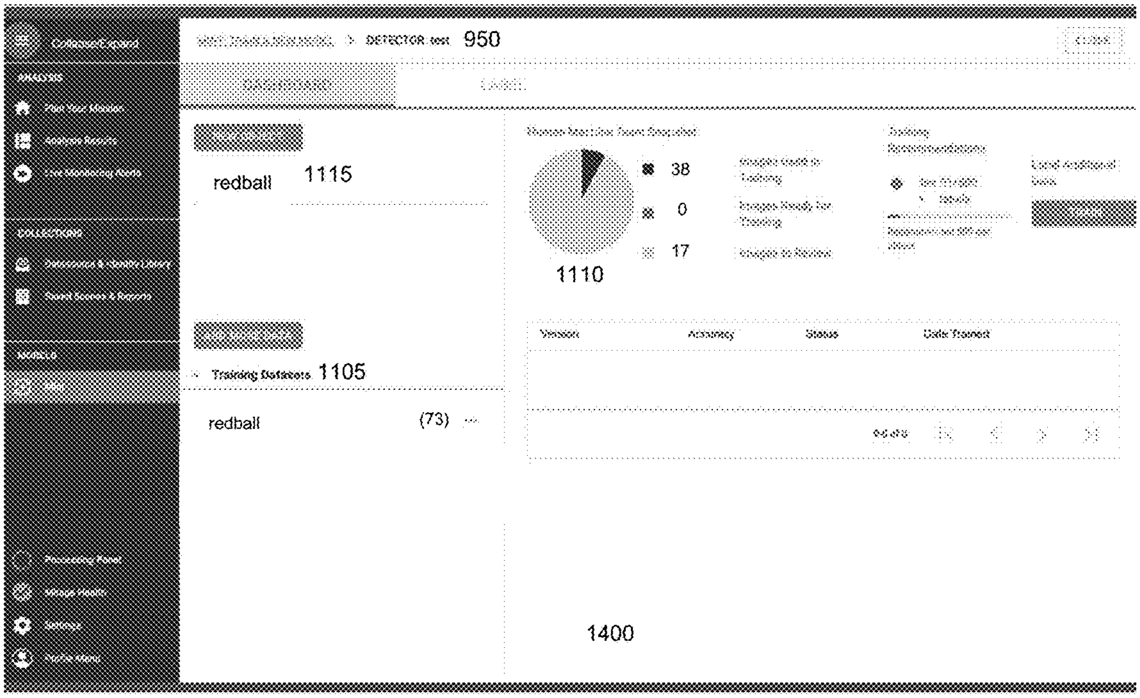
Figure 14A - REVIEW
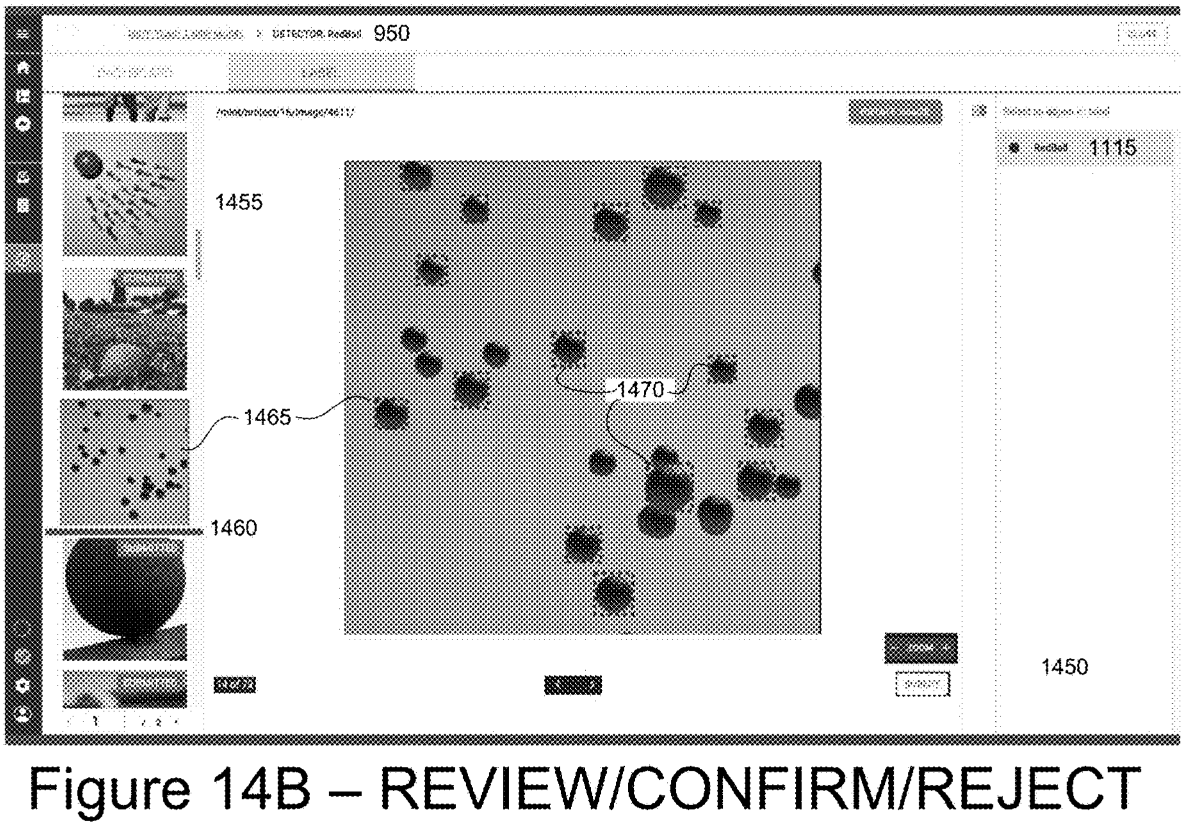
Figure 14B – REVIEW/CONFIRM/REJECT

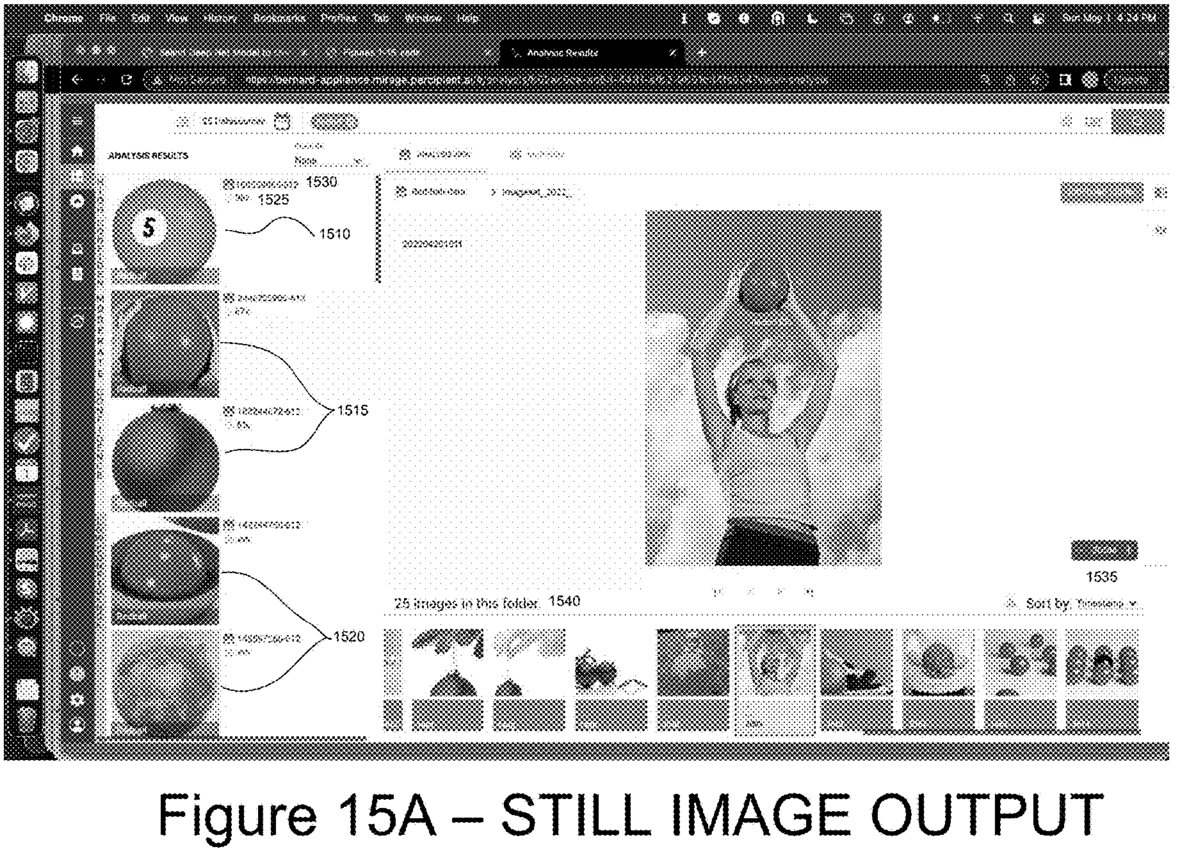
Figure 15A – STILL IMAGE OUTPUT
Figure 15B – VIDEO OUTPUT

SYSTEMS AND METHODS FOR RAPID DEVELOPMENT OF OBJECT DETECTOR MODELS

RELATED APPLICATIONS

This application claims the benefit of U.S. Patent Application Ser. No. 63/337,595 filed May 2, 2022, and further claims the benefit of U.S. Patent Application Ser. No. 63/329,327 filed Apr. 8, 2022. It is also a continuation-in-part of U.S. patent application Ser. No. 17/866,396 filed Jul. 15, 2022, which is a 371 conversion of PCT Application PCT/US21/13940 filed Jan. 19, 2021, which in turn is a continuation-in-part of U.S. patent application Ser. No. 16/120,128 filed Aug. 31, 2018, which in turn claims the benefit of U.S. Patent Application Ser. No. 62/553,725 filed Sep. 1, 2017. Further, this application is a continuation-in-part of U.S. patent application Ser. No. 17/866,389 which is a 371 conversion of PCT Application No. PCT/US21/13932, both of which in turn claim the benefit of U.S. Patent Application Ser. Nos. 62/962,928 and 62/962,929, both filed Jan. 17, 2020, and also U.S. Patent Application Ser. No. 63/072,934, filed Aug. 31, 2020. The present application claims the benefit of each of the foregoing, all of which are incorporated herein by reference.

FIELD OF THE INVENTION

The present invention relates generally to computer vision systems configured for detection and recognition of objects in video and still imagery in a live or historical setting, and more particularly relates to the development of teacher-student object detector models that improve computational efficiency and, in related aspects, enable training of a network with reduced numbers of training images through the use of machine assisted labeling, active learning and iterative techniques to achieve desired levels of accuracy in object detector models.

BACKGROUND OF THE INVENTION

Conventional computer vision and machine learning systems are configured to identify objects, including people, cars, trucks, etc., by developing a computer vision model trained to recognize features of the object or objects. More generally, conventional imagery processing systems utilize one or more learned models to detect objects of interest in still frame images or in frames of video.

Deep learning methods and techniques have become standard for use in computer vision applications as well as other areas of artificial intelligence. In particular, Convolutional Neural Networks (CNN) are generally regarded as providing state-of-the-art results. An approach to building a computer vision model using CNNs can be generalized as having four steps, where the first step includes a key difference between classifiers and detectors. In either, the first step is to create a dataset comprised of annotated images, if one does not already exist. For classifiers, the objective annotations simply provide a confidence value that a given image includes at least one occurrence of an object of interest, and the image receives only one label indicating the class of the object of interest regardless how may such objects occur in that image. Detectors, in contrast, both identify and locate each occurrence of an object of interest in an image, where a bounding box is drawn around each occurrence with a label for each bounding box. For example, if the object of interest in a dog and a given image includes two dogs, a classifier will label the entire image "Dog". A detector will put a bounding box around each of the two dogs, and label both boxes "Dog."

As a second step, features pertinent to the task at hand are extracted from each image. This is a key point in modeling the problem. For example, the features used to recognize faces, features based on facial criteria, are obviously not the same as those used to recognize tourist attractions or human organs, although some models are trained to detect many classes of objects. Then, as a third step, a deep learning model is trained based on the features isolated. Such training means feeding the machine learning model many images and it will learn, based on those features, how to solve the task at hand, i.e., detecting images that include objects with those features. Training typically includes both positive and negative training, where negative training refers to images that do not include the objects of interest. Last, the fourth step is to evaluate the model using images that weren't used in the training phase. By doing so, the accuracy of the training model can be tested.

While the foregoing strategy works for the initial development of a model, it presents a number of challenges, especially for detectors as opposed to classifiers, where there is a desire to be able to detect an additional class of object for which the original model was not trained. Among those challenges is the need, in most systems, to have a dataset with a large number of images. A common rule of thumb is 1,000 images for each class. A further issue for developing object detection models as opposed to classifiers is the time required to achieve the labeling necessary to develop an object detection model from scratch. One of the challenges of labeling is the confusion that can result when every instance of the object of interest in an image is not labeled. The requirement for both accuracy and a sizable number of images makes it difficult for persons who have not received specialized training to develop an object detection model that will perform with reasonable accuracy. It should also be understood that the images need to be diverse and representative of real-world conditions to yield good results.

When there is a need to build a model capable of detecting a different object than the existing model was designed, prior art solutions face even more challenges. One significant challenge with adding newer object types is the increased labeling costs, while a second significant challenge is the increased computational expense. For example, a model M1 has been trained on dataset D1 for a set of objects O1. The customer is now interested in an additional set of objects O2, with instances of O2 in the images of a new dataset D2. The new dataset D2 is as yet unlabeled for any objects, which results in the aforesaid rising labeling costs and rising run time costs.

The rising labeling costs result because one cannot simply label O2 objects in D2 and then train a combined (O1+O2) detector on the dataset (D1+D2). This is because D1 may have occurrences of objects from the set of objects O2 that will not be labeled since the user was initially interested in only the set of objects O1. Where objects appear in an image, but are not labeled, during training the detector identifies the unlabeled objects as not being of interest, and so detection of those objects is excluded from the model. The result is that training a combined (O1+O2) detector on (D1+D2) in this manner will lead to false negatives. To avoid this, in conventional approaches the images of D1 must be revisited to label any of the set of objects O2 present in those images. For similar reasons, all O1 objects would need to be labeled in the images of dataset D2. Both labeling tasks can be very laborious, as the list of objects, and the amount of data keeps growing over time.

An alternative approach might be to label only O2 objects in D2, and build a new model M2 that only detects O2 objects. In the production environment, for each new image, the model M1 would first be run on the production images, followed by running the model M2 on the production images. The downside is that such a process results in additional computational time per image, which increases every time the customer is interested in a new set of objects. If the process of running an additional model for every new set of objects is continued indefinitely, there will be a time when the total computational expense becomes prohibitive.

When the objective of the system is only classification, rather than detection, a technique termed Transfer Learning has been used to reduce computational expense, for example by the use of a Teacher-Student model. In classifiers using such Transfer Learning techniques, an already-trained model serves as a starting point. Typically that already-trained model has seen a large number of images and learned to distinguish among the classes. If so, that classifier can be taught a few new classes in the same domain (i.e., generally same type of objects) based on a relatively small number of training images. However, the greater complexity of object detection models has made such conventional Transfer Learning techniques unworkable for detection.

Because of the foregoing challenges, typical end-users have refrained from developing their own object detection models and instead have relied on third parties to develop such models. This limitation makes it difficult for such a customer to develop a model where the mere knowledge that a search is being performed for the object of interest is highly confidential.

As a result, there has been a long-felt need for a system and method that would provide the benefit of Transfer Learning to object detection models. Further, there has been a long-felt need for a system and method for developing object detection models that can be executed by an end-user without significant specialized training and allows the subject of the search to remain confidential within the end-user organization. Still further, there has been a long felt need for a schema for developing an object detection model for a new object where only comparatively few images are available for training while still yielding acceptable accuracy and minimizing computational expense.

SUMMARY OF THE INVENTION

The present invention substantially resolves the limitations of conventional systems performing object detection in that it provides a process and system by which a user without specialized training can develop custom object detection models using substantially fewer images than in conventional systems, while permitting the developer of the model to maintain confidentiality regarding the object of interest. In an embodiment, the system receives from a user an image dataset comprising a quantity of images, either in the form of still frame images or in the form of video snippets comprising a sequence of video frames. The volume of images is reduced compared to conventional systems, and at least in some embodiments forms a small dataset.

A randomly selected batch of images is selected from the image dataset and occurrences of the object of interest are labeled on the images included in the batch. Those labeled images form training data for a deep learning network, and once the network is trained a first iteration of a custom model is developed, where that model typically is specific to a much more limited number of classes, and in at least some cases just one class. The system also includes a system production model, which in some embodiments has been extensively trained to detect a variety of classes of objects. The system production model and the iterated model operate as teacher models in an teacher-student network, where the classes that each of the teacher models are trained to detect are combined in an optimization process to yield a merged, or student model that can detect all of the objects that either teacher model can detect. In an exemplary embodiment the optimization process comprises a classifier and a regressor run at anchor boxes across the image, which are specific locations in the image, at various aspect ratios. The merged model is run against a production dataset which can comprise either still frame images or frames from video sequences, which are fed back to the original images and video for correction of labeling errors and/or updating of missed labelings. By iterating through several rounds of selecting a batch of images and/or correcting any mislabeled images from a prior batch, the merged or student model converges and yields usable results.

To further improve results, the iterated model is also provided to a machine assisted labeling process as well as an active learning process. The outputs of both are also fed back to the original images and video to allow correction of mislabeled images or partly labeled images. In addition, the video output is supplied to a tracking process that identifies the location of objects in sequential frames of the video, whereby only a single frame can be labeled initially and the tracking process receives that labeling data and can apply it to the remaining frames of the video snippet. The output of the tracking process then is combined with the labeled still frame images to yield training data for the custom model. It will be appreciated by those skilled in the art that, in implementations where the system production model does not yet exist, the development of the system production model can be efficiently achieved by the process of developing the iterated model, in some embodiments including the machine assisted labeling and active learning subprocesses described in greater detail hereinafter.

For instances in which an object, or at least a CAD or similar model thereof, is available but a suitable volume of different images is not, in a related aspect of the invention a wide variety of synthetic images can be generated.

It is therefore one object of the present invention to provide a deep learning system capable of combining two or more teacher models trained for detection of different objects into a single student model capable of detecting all of the objects of the two or more teacher models.

It is another object of the present invention to provide a deep learning system capable of combining two or more teacher models, trained for detection of different objects where at least one is trained for detection of a plurality of objects, into a single student model configured to detect all of the objects of the two or more teacher models.

A further object of the present invention is to provide a deep learning system capable of combining two or more teacher models, each trained for detection of one or more objects wherein at least one of the teacher models is trained to detect objects different from the objects the other teacher models are trained to detect, into a single student model configured to detect a combination of objects comprising one or more objects from each teacher model.

It is a further object of the present invention to provide a deep learning system capable of combining two or more teacher models trained for classification and detection of different objects into a single student model that is able to detect all the objects.

It is a further object of the invention to provide a system wherein new classes of objects can be added to a previously developed and trained object detector network without requiring an operator to relabel objects in the training data of the previously developed object detector.

It is yet another object of the present invention to provide a deep learning system and method configured to achieve acceptable accuracy using partially labeled datasets to train a model.

It is another object of the present invention to provide a deep learning system and method that achieves acceptable accuracy while using different sets where only a single or only some objects of interest are labeled.

It is a further object of the present invention to provide a deep learning network and process that uses active learning to reduce the number of labeled images required to develop a model successfully.

It is a still further object of the present invention to provide a system and process for improving object classification and detection accuracy through the use of machine assisted labeling.

Yet another object of the present invention is to provide a system and process for improving object detection through the use of active learning.

It is another object of the present invention to provide a system and process for improving object detection through the iterative application of low shot learning to a reduced image set.

It is an additional object of the present invention to provide a deep learning system capable of combining two or more teacher models trained for classification and detection of different objects into a single student model containing a combination of objects from each of the teacher models.

A still further object of the invention is to provide an optimization process for teacher-student models comprising distillation.

Another object of the present invention is to provide an optimization process for teacher-student models comprising a classifier and a regressor, Yet a further object of the present invention is to provide a system and method having improved computational efficiency for optimizing a merged model.

It is yet another object of the present invention to provide a system and method for developing a system production model through use of an iterative model augmented with active learning, machine labeling, or both.

A further object of the present invention is to provide a system and method for ordering data such as images according to an uncertainty score.

Yet a further objection of the present invention is to provide a system and method for visually differentiating labels proposed by the system for operator review from labels below a threshold.

A still further object of the present invention is to provide a system and method for providing to an operator an opportunity to review images having an uncertainty score above a threshold value, where the operator can be either automated or human.

These and other objects of the invention can be better appreciated from the following Detailed Description of the Invention, taken together with the appended Figures briefly described below.

THE FIGURES

FIG. 2 shows in generalized block diagram form an embodiment of a process for optimizing a teacher-student network in accordance with an aspect of the invention.

FIG. 3A illustrates a teacher-student optimization process in accordance with an embodiment of the invention.

FIG. 3B illustrates a more generalized version of a teacher-student optimization process in accordance with a further embodiment of the invention.

FIG. 4 illustrates in generalized block diagram form an embodiment of a process for active learning in accordance with an aspect of the invention.

FIG. 5 illustrates in generalized block diagram form an embodiment of a process for generating synthetic images in accordance with an aspect of the invention.

FIG. 8 shows an embodiment of a dashboard of a production system in accordance with the invention.

FIGS. 9A and 9B show an embodiment of a user interface for creating a new custom model including a new detector in accordance with the invention.

FIG. 10 illustrates an embodiment of a user interface screen for adding images for training the new model in accordance with the invention.

FIG. 11A shows an embodiment of a user interface for defining a new object of interest in accordance with the invention.

FIG. 11B shows an embodiment of a system-generated screen for avoiding duplication of objects of interest in accordance with the invention.

FIG. 12A shows an embodiment of a user interface for beginning the process of labeling images to identify detections in accordance with the invention.

FIG. 14A shows an embodiment of a screen of a user interface the shows the results of an initial iteration of the training process of the invention.

FIG. 14B shows an embodiment of a screen of a user interface whereby an operator is enabled to confirm or correct labels applied by an embodiment of the system and process of the present invention.

FIG. 15A shows an embodiment of a screen of a user interface showing still frame images selected by the system using the new custom model for presentation to an operator in response to an operator query for the new object.

FIG. 15B shows an embodiment of a screen of a user interface showing video snippets selected by the system using the new custom model for presentation to an operator in response to an operator query for the new object.

DETAILED DESCRIPTION OF THE INVENTION

Figure 1:
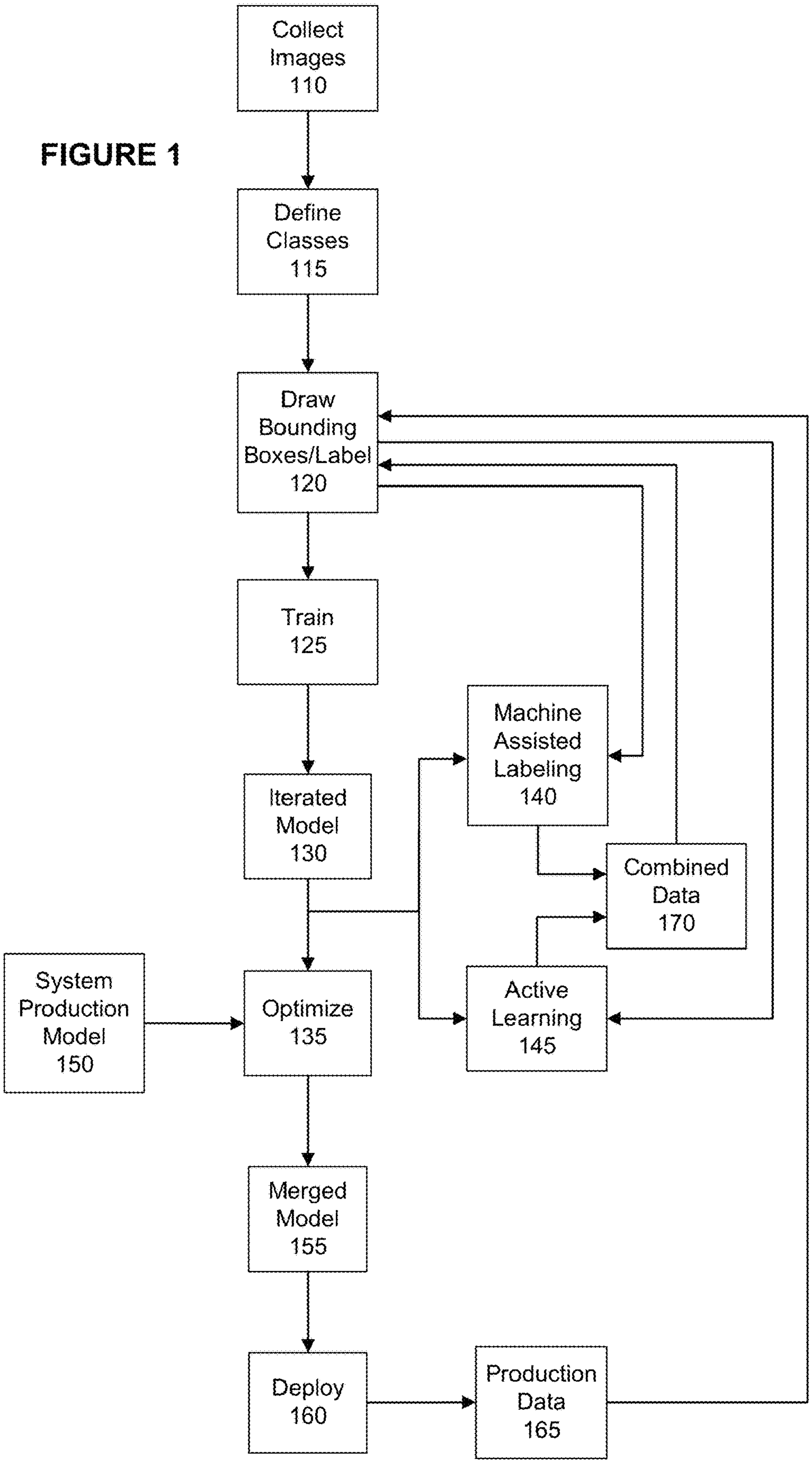
FIG. 1 illustrates in generalized block diagram form an embodiment of a system for creating an object detector model using an enhanced version of transfer learning to substantially reduce computational expense relative to conventional methods.

The present invention enables a user to create an object detection model for custom objects, and to then use that custom model to find those objects is video and still frame imagery where that imagery can be either live or prerecorded. In an embodiment of an aspect of the invention, the training of the custom object detection model is achieved with a volume of training data substantially less than in many prior art systems. In an embodiment of a further aspect of the invention, the custom model, together with a backbone object detection neural network that is pretrained on a variety of objects, forms the teacher portion of a teacher-student ensemble network which permits development of an optimized student object detection model with significantly improved computational efficiency. In an embodiment, each of the networks is a "Single Shot Multibox Detector" or "SSD" neural network for the detection task, with classification and regression performed at and relative to anchor boxes, where, in at least some implementations, the predefined, fixed grid of anchor boxes is spread uniformly through the image. While the following description assumes a supervised learning model, those skilled in the art will recognize, once they have digested the teachings herein, that unsupervised learning can also be used in at least some embodiments. In particular, if a model is "pre-trained" on a large amount of video data, all using unsupervised data—basically "self supervision", the amount of fine tuning that would be needed to build a specific model would be significantly reduced. While such a general purpose model that will work for any scene requires substantial compute power and data storage, data with considerable redundancy will greatly reduce compute and data storage needs considerably. Where the data source is a specific camera or group of cameras, which is a common configuration wherein a specific camera will see a highly regular scene with a lot of redundancy, an unsupervised learning system can reduce the tuning time.

To develop a custom object detector model, a set of representative images of the object of interest is gathered. The images can come from an existing or newly captured dataset or, in some embodiments, can be generated synthetically, as discussed in greater detail below in connection with FIG. 5. It is desirable that the images capture a range of textures, viewpoints, lighting, and occlusion conditions. To avoid bias in the detector, it is also desirable to use images that are representative of the environment where the object is needed to be located. For example, if the object of interest is a "red ball", the images will preferably comprise images shot at locations where such a ball needs to be found, such as playing fields, etc.

Each of the images is then labeled by identifying all of the occurrences of the object of interest and drawing a tight bounding box enclosing the entire object without extraneous elements. The minimum number of images for generation of a model can vary depending upon the size of the dataset and the nature of the objects being sought, but is typically between 10 and 1,000, with 50 images an exemplary number.

Once a sufficient quantity of images has been labeled, training is performed by the associated SSD, which may be operating with any of a variety of backbones, for example Resnet50, Resnet34, InceptionV3, or numerous other SSD variations, but, for at least some embodiments, with the weights unfrozen so that the detectors can be fine tuned for a specific task by propagating the gradient of the loss function from the top to the bottom. The output of the SSD's comprises a first model. That model, together with an extensively trained system production model, comprise the "teacher" side of a teacher-student network, where the teacher networks are merged in an optimizing step using a novel form of distillation and the output of that step is a student model capable of detecting objects in all of the classes for which the system production model is trained plus all classes that can be detected by the iterated model. In some embodiments, no system model will have been previously developed. In such a case, the event that no system production model has been developed, The model is then tested against a set of images for validation, which provides an indication of how well the model performs. As discussed below, and depending upon the embodiment, various feedback and iterative techniques can be implemented to improve the model. In at least some embodiments, it is desirable to provide interoperability between the system production model and the custom, or iterated, model. Thus, in an embodiment, the two teacher models use a common vocabulary of object classes, where an operator seeking to designate a new class can see the previously trained classes and thus avoid duplication. Further, in an embodiment, the models use the same deep neural network framework, although such commonality is not required in all embodiments. In other embodiments, interoperability can be achieved where the neural network models are understandable in both frameworks, for example using the ONNX format although the ONNX format does not always yield successful results without operator intervention. It will be appreciated by those skilled in the art that, if the networks are interoperable, the custom model can be merged with the system production model. Further, should the system production model yield poor results, for example as the result of poor labeling, the images from the system production model can be supplied to the image set of the present invention such that any labeling errors can be corrected, resulting in a more accurate production model.

FIG. 1 shows in block diagram form a generalized view of an embodiment of a system for developing custom object detector models in accordance with the invention. More specifically, FIG. 1 illustrates broadly how such a system is perceived by an operator, while FIG. 2 illustrates a more detailed view of the system from the process execution perspective. Referring particularly to FIG. 1 for now, the process begins at 110 by collecting representative images of the object of interest that show the object in the various contexts in which it might occur naturally as discussed above. In some instances where custom object detection models are desired, the operator of the system may have physical examples of the object, or an exemplary CAD model, or images taken out of context, and appropriate image datasets can be developed from such data using synthetic techniques as described below and described in connection with FIG. 5. In some embodiments where the dataset is developed entirely synthetically, no human involvement is required, whereas in other embodiments the operator will select and provide the necessary images.

At step 115, the classes of objects are defined, for example, "red ball", or "sunflower", or any other appropriate term. The descriptors for the class are assigned by the operator in many embodiments, although it will be appreciated that, if synthetic data is used, the object is already defined and, as with step 110, no human involvement is required. Next, at step 120, at least some of the images from the collected image set are labeled by applying bounding boxes tightly around each occurrence of the object in the images. While human intervention is required to applying bounding boxes for many types of images, for at least synthetic images the labeling can be performed automatically, since the process of generating a synthetic image includes knowing where the object is within the image. Next, at step 125, the model is trained by processing the labeled images in an appropriate neural network, where the result is an iterated model 130. The training process is typically an SSD as described above although in some instances a Low Shot Learning approach can work to get to an iterated model faster with less labor in acquiring training data. Other types of deep learning networks suitable for detecting objects in imagery are also acceptable. In an embodiment, the backbone or deep residual network of the SSD can be the Resnet50 architecture, although architectures such as InceptionV3, Resnet34 with an additional layer for smaller objects, or any other functionally equivalent architecture may also be acceptable.

The output of the iterated model 130 is a set of images and labeling data, where the top layer classifier for the iterated model will have two outputs, specifically new-class versus background. That output is supplied to an optimization process 135, described in more detail in connection with FIG. 3, below and also supplied to a machine-assisted labeling process 140 and an active learning process 145, both of which receive the images that remain unlabeled by the operator at step 120, as discussed in greater detail hereinafter. Generally, the machine assisted labeling process 140 receives the unlabeled images from 200 and 205 and, based on input from the iterated model 130, evaluates those unlabeled images and provides hints, or suggestions, as to what label or labels should be applied to each of the unlabeled images. Those hints or suggestions are, after combination with the results of the active learning process, returned to the queue of the images dataset being labeled at 120 to permit either a human or automated operator to confirm, ignore or correct labels applied by the system to previously unlabeled images. The manner in which these suggestions are provided to an operator is discussed in greater detail hereinafter in connection with an embodiment of a user as shown in FIGS. 8-15B, and particularly in connection with FIGS. 14A-14B.

Active learning 145, discussed in greater detail in connection with FIGS. 2 and 4, tests the confidence, or lack thereof ("uncertainty") that an image has been correctly labeled, then sorts the unlabeled images (i.e., not labeled by an operator) from the iterated model 130 according to their uncertainty value. A group of images having the greatest uncertainty is then fed back to labeling step 120 for reconsideration by the operator, after being combined at step 170 with the results of the machine-assisted labeling step 140. It will be appreciated by those skilled in the art that, because the machine-assisted labeling process 140 and the active learning process 145 both evaluate the same unlabeled images in at least some embodiments, the function of the combining step 170 is to organize the output of those processes in a way that minimizes the effort required of an operator to cause the model to yield acceptable results.

Through repetition of the cycle of labeling, training, creating the iterated model, testing for uncertainty, then sending the least certain images back to the operator for reassessment, the model is iteratively improved. Because the uncertainty threshold or selection process can be adjusted according to any convenient criteria, the size of the group of images sent back for review by the operator can be comparatively small compared to the full dataset, with the result that a relatively small volume of images can, through iterative assessment, refine the iterated model 130 until it achieves acceptable accuracy. This reduces the labor involved and can also reduce computational expense.

As noted above, the output of the iterated model 130 is also supplied to an optimization process 135, which also receives as an input the images and a system production model 150. The system production model 150 and the iterated model 130 form the teacher pair of networks, where each is trained for different objects and, through optimization process 135, their trainings are combined into a single student model, specifically merged model 155, trained to detect any object or objects that could have been detected by either (or both) the system production model or the iterated model. The merged model will have (N+1)+1=(N+2) outputs where the last "+1" is for the background class. Omitted from FIG. 1 for the sake of simplicity, but discussed in greater detail hereinafter, is that optimization step 135 also receives as inputs the training data for the system production model and the iterated model, and also receives as an input the unlabeled images.

The output of the merged model is then deployed, step 160, where it is applied to the production data 165. The results of that deployment are then fed back to step 120, as were the images labeled by the machine-assisted labeling process 140 and the active learning process 145, to allow the operator to correct the labeling of any images that the operator determines were mislabeled. It will be appreciated that, depending upon the embodiment, the feedback from one or more of the feedback sources 140, 145 and 165 is optional.

Further, in implementations where the system production model still needs to be developed, the foregoing steps can be used to create the system production model simply by executing the above-described process steps but without inclusion of the system production model and its associated dataset as inputs. As just one example, in an embodiment, the first execution of the process of the invention, including the aforementioned feedback as desired, classifies and detects a first object. That model, while capable of classifying and detecting only a first object can be used as a nascent system production model, where each successive execution of the process adds an additional object to the objects that can be detected by that developing system production model. The collection of training data developed through successive addition of objects to the developing system production model becomes the system production training dataset. For purposes of the present invention, the foregoing description of the development of the system production model is not intended to be limiting, and the system production model can be developed in any suitable manner, The following description of the invention assumes a pre-existing system production model unless specifically stated to the contrary, although it will be apparent to those skilled in the art, upon digesting the details presented hereinafter, how to modify those processes and systems to develop the system production model if one does not yet exist.

Referring next to FIGS. 2 and 3A, as noted above FIG. 2 illustrates a more detailed view of the system from the process execution perspective while FIG. 3A extracts from FIG. 2 the elements of a teacher-student network used to perform a version of optimization that is a novel approach to distillation. The processes of FIG. 2 begin at 200, where a set of images initially comprises a dataset where at least some of the images include an object of interest. The image set 200 initially comprises unlabeled images 200A, but, as explained further below, will eventually include both unlabeled images 200A and labeled images 200B, and ideally will eventually include only labeled images 200B. Either alternatively or in addition, one or more video snippets 205 also comprise a dataset where at least some of the frames of the video snippets include an object of interest. As with images 200, initially all of the video snippets are unlabeled but eventually comprise unlabeled video snippets 205A and labeled video snippets 205B, and, ideally, ultimately only labeled snippets 205B.

To begin, in an embodiment a user assigns a name to an object of interest and then labels a batch of unlabeled images 200A. In some embodiments, the batch may range in size from about ten images to 1000 or more images, at least partly based on the size of the production data set. The images in the batch are then labeled, step 210, where step 120 of FIG. 1 essentially comprises steps 200, 205 and 210, by tightly enclosing in a bounding box each appearance of the objects of interest in each image, where the process of assigning a bounding box to a detected object is performed by a human operator, a previously trained network, or other similar approach. The output of the labeling step 210 for that batch forms training data 250. Once the training data image set 250 includes all of the images from the batch, the deep learning network is trained at step 125 by processing the training dataset 250.

The result of the training step 125 is the first iteration of iterated model 130, which also functions as a teacher as discussed further below and shown in simplified form in FIG. 3A. As shown in FIG. 1 and discussed there, this first iteration of the iterated model 130 is supplied to an Optimize process, step 135, which performs a novel form of distillation, and is also supplied to a machine-assisted labeling process, step 140 and an active learning process, step 145, as touched upon above and discussed in greater detail hereinafter. The machine-assisted label process 140 and the active learning process 145 each receive the remaining unlabeled still frame images and video snippets from image sets 200 and 205, and, after processing as described in greater detail below, the results of those processes are combined at step 170 and fed back to the queue of images and video snippets in 200 and 205, where images are then provided to the user for review based at least in part on uncertainty scores.

Still referring to FIG. 2 but also as seen in simplified form in FIG. 3A, in addition to receiving the iterated model 130, the optimize process, step 135, also receives the unlabeled images and unlabeled video frames from image sets 200A and video set 205A, as well as the system production model training dataset 260, the training dataset 250 (which can in some embodiments be the same as 260, for example if the system production model 150 had been trained to detect faces while the client-generated custom model 130 was trained to detect faces plus bodies), and also receives as an input the system production model 150 which has been trained to detect many more classes than iterated model 130 is trained to recognize. The dataset 260 can be any of a wide variety of datasets, for example MS-COCO, OpenImages, or any pre-labeled dataset including privately developed datasets. Further, a group of new images and/or videos comprising new unlabeled data 255 from any convenient image set and not necessarily related to the images or videos 200/205, provides a further input to the iterated model 130, the system production model 150, as well as the optimize step 135. The optimization step 135 implements a teacher-student network to perform knowledge distillation, where the optimization performed at step 135 combines the detection capabilities of iterated model 130 and system production model 150 as teachers 300 and provides that distilled knowledge to merged model 155, or student 305, as discussed in greater detail in connection with FIG. 3A and described in more general terms in connection with FIG. 3B, below.

Still referring to FIG. 2, the distillation performed by the optimization step results in the merged model being able to detect not only the classes of objects of the system production model, but also the class(es) of objects added by the customer. The merged model is then run against the production data 165, typically comprising a larger set of unlabeled images and video frames than the initial batch 200A. The production data, now labeled, is then provided to the operator to form part of image set 200B. Likewise, the images fed back from processes 140 and 145 are included in the labeled image set 200B. The labeled images are then presented to the operator at step 210, to permit the operator to correct any labeling errors that resulted from any of steps 140, 145 and 165, or to add any bounding boxes for objects that were missed on an earlier iteration.

In an additional aspect of some embodiments of the invention, tracking of video snippets, indicated at 270 in FIG. 2, can be provided to reduce the number of images to be labeled, thus reducing both labor and computational expense. In an embodiment, a video snippet comprises a series of sequential frames of an object, although not necessarily the object of interest. Objects in video, at a reasonable frame rate, have redundancy in their appearance as well as spatial position. The number of frames in a snippet varies according to how long invariant features of the object can be identified in successive frames, as taught in the related applications identified above. By selecting one of the frames of the snippet for labeling as shown at step 210, the location of the object in the remaining frames of the snippet can be automatically calculated and the object labeled by the tracking process 270. The labeled video snippet can then be processed in the same manner as still images from image set 200, including receiving feedback from any of steps 140, 145 and 165, followed by correcting any mislabeling or adding bounding boxes for missed objects. Any convenient algorithm for tracking can be used, for example some single-shot learning based frameworks can allow the system to learn a detection model from a single labeled instance. The trained model effectively outputs parameters of a detector of a given instance that can be used to detect similar looking objects in subsequent frames. In order to track multiple objects in the scene, a set of these detectors is used to individually track the bounding boxes and drop the detections when the detection score is lower than some threshold. The threshold can be set in any convenient manner, for example empirically, through experimentation, via a preset threshold, and so on.

Referring again to FIG. 3A, FIG. 3A extracts from FIG. 2 the elements comprising the teacher-student network that facilitates a form of distillation whereby two or more teacher models, trained for different classes of objects, are combined into a single student model that is able to detect all of the objects of both teacher models. Conventional ensemble networks allow for redundancy, and essentially average the predictions made by the constituent neural networks, resulting in improved accuracy but with high computational cost because traditional ensemble networks run multiple neural networks first. Distillation allows transfer of knowledge from the large network (which can be thought of as a "teacher") to a simpler "student" network, preserving accuracy while reducing computational costs. The training in distillation algorithms occurs by running inference for "teacher" networks on their respective training data, and using their responses as soft labels (or targets) for training the "student" network. For labeled data both the hard labels (ground truth) and the soft labels are used for training. In principle, a student model can also be trained from a teacher model from sufficiently representative unlabeled data only.

While distillation is known where the task is to classify an image into different categories, the present invention extends this concept to a detection task where the model is required to report not only whether an object of a particular class exists in an image, but also the location of that object in the image, with the location typically represented as within a tight bounding box around the object. In an embodiment, the present invention enables combining two or more teacher models trained for different objects into a single student model containing all the objects, and also enables using only partially labeled datasets to train a model. That is, at least some embodiments of the invention enable using different sets where only a single one or only some objects of interest are labeled, thus saving substantial effort in that it becomes unnecessary to review all the data and relabel all the objects in all the images.

Thus, in FIG. 3A, teacher networks 300 comprise the system production model 150 and the iterated model 130, or just two teacher networks whose knowledge will be merged into merged model 155, or student 305, through the optimize process 135. To perform the optimization, the training data of the system production model, 260, as well as training data 250 and new unlabeled data 255 serve as inputs to the optimize process 135 along with each of the teacher networks 300. The process of merging those teacher networks, run against the datasets 250, 255 and 260, to create the student detector network 305 can be better understood from the following discussion of classification and regression.

In an embodiment of the invention, a "Single Shot Multibox Detector" (SSD) neural network is used for the detection task. Classification and regression are performed at and relative to predefined, fixed grid of boxes called "anchor boxes". For a large set of "anchor boxes" spread uniformly through the image, the SSD algorithm trains a network to perform two tasks, classification and regression, where classification is determining the probability distribution of the presence of any of the objects of interest, or the background at an anchor box and regression is determine the bounding box of the object that is detected at the anchor box.

Classification is modeled as a softmax function to output confidence of a foreground class or the background class:

$$P(C_k|X) = \frac{\exp(C_k)}{\sum_j \exp(C_j) + \exp(B)}$$

for foreground classes $C_k$ and background class B, for the anchor box X. Note here that background is treated just as one of the class amongst all the classes modeled by the softmax function. The background class is trained by extracting negative examples around the positive examples in the labeled images. The loss function for training the classifier is a cross-entropy loss defined for every association of anchor box to a label denoted by $X_{Label,Anchor}$ [Eq. 1, below]:

$$L_{conf}(C, X) = -\sum_{x\in Pos}^{N}\sum_{Label}^{Clases} x_{Label,\ Anchor} \log(P(C_{Label}|X)) - \sum_{x\in Neg}^{N} \log(P(C_B|X))$$

Regression is modeled as a non-linear multivariate regression function that outputs a four-dimensional vector representing center coordinates, width and height of the bounding box enclosing the object in the image. The loss function for training regressor is a smoothL1 loss function $L_{loc}(C,X)$. Only foreground objects are used for training the regressor as background class has no boundaries [Eq. 2, below]:

$$L_{loc}(C, X) = \sum_{x\in Pos}^{N} x_{Label,Anchor}\text{smooth}_{L1}(\Delta x_{Box} - \Delta x_{Pred})$$

Here $x_{Label,Anchor}$ is 1 for an association between a positive label and a predefined anchor box. $\Delta x_{Box}$ is the offset of the ground truth label relative to the associated anchor box, $\Delta x_{Pred}$ is the predicted bounding box from the network.

For training a standard SSD[3] model, parameters are learned that minimize $L_{conf}(C,X)+L_{loc}(C,X)$ defined over a selective set of positive and negative anchor boxes X, chosen using the using the labels from manually annotated images. These labels are called hard labels with one-hot encoding for positive samples.

As a part of the workflow for the present invention, an operator will train multiple detectors by labeling multiple sets of data where only a particular object of interest is labeled in each dataset. Distillation enables an operator to train a single student model from multiple teacher models without losing accuracy, and without requiring the operator to label all the objects on all the datasets. The advantage of doing this is the performance gain resulting from running a single detector instead of multiple detectors.

The teacher in this case constitutes multiple networks of similar complexity, where each network is able to detect a new class of object as trained by the user. The student is a new network of similar complexity as the teacher models, where the goal is to distill the knowledge from multiple teacher models into a single student model.

While the distillation process can be performed on any number of teacher networks, as an example, the algorithm can be illustrated by using two teacher networks $M_1$ and $M_2$ to train a student network M. The teacher networks are trained to detect class $C_1$ and $C_2$ with the respective "background" classes $B_1$ and $B_2$. "Background", in this context, means regions that do not contain the object of interest. (Labeled-Data)$_1$ and (Labeled-Data)$_2$ are employed for training $M_1$ and $M_2$ that have only their respective classes labeled.

In an embodiment, the student model is a single deepnet model M with two classes and a single background class B that is an intersection of classes $B_1$ and $B_2$. The probability mapping for the combined model can be performed as follows. For the input X, the model for (Labeled-Data)$_1$ and (Labeled-Data)$_2$ has class probability as $P(C_1|M_1,X)$ and $P(C_2|M_2,X)$ respectively. Corresponding background probabilities are $P(B_1|M_1,X)$ and $P(B_2|M_2,X)$ respectively. The probabilities for the teacher models are computed as follows:

$$P_{Teacher}(B|X)=P(B_1|M_1,X)\times P(B_2|M_2,X)$$

$$P_{Teacher}(C_1|X)=P(C_1|M_1,X)\times P(B_2|M_2,X)$$

$$P_{Teacher}(C_2|X)=P(C_2|M_2,X)\times P(B_1|M_1,X)$$

In this example, the loss terms for training the SSD comprise a loss term for the classifier and a term of the regressor, shown in Eq. 1 and Eq. 2, above. In the present invention, the loss function for training a student model is a linear combination of two loss functions:

Loss1: Positive labels are hard labels that are extracted from (Labeled-Data)$_1$ and (Labeled-Data)$_2$ where only positive labels are sampled and no negative samples are extracted because it isn't known whether a negative sample for class $C_1$ has a class $C_2$ object (and vice-versa).

a. For training the classifier, only positive examples are used in the cross-entropy loss in Eq. 1, above.

$$Loss1_{conf}(C, X) = -\sum_{x\in Pos}^{N}\sum_{Label}^{Clases} x_{Label,Anchor}\log\left(P\left(C_{Label}|M, X\right)\right)$$

Here $x_{Label,Anchor}$ is 1 for the correct class and 0 for rest of the classes.

b. For training the regressor, only bounding boxes for positive labels are required. The smooth-L1 loss is used, as defined in the loss function, Eq. 2, above Loss2: For each object, extract a quantity (for example, 400) of the top detection bounding boxes $Pos_1$ and $Pos_2$ with a score greater than 0.01 both from model $M_1$ and $M_2$ respectively:

a. These are soft labels for the SSD classifier and are used as cross-entropy loss for training the classifier. Instead of using hard binary targets, soft targets are used in the cross entropy loss for training student model M $$Loss2_{conf}(C_1, C_2, X) = -\sum_{x\in Pos}^{N} P_{Teacher}\left(C_1|X\right)\log\left(P\left(C_1|M, X\right)\right) - \sum_{x\in Pos}^{N} P_{Teacher}\left(C_2|X\right)\log\left(P\left(C_2|M, X\right)\right) - \sum_{x\in Neg}^{N} P_{Teacher}\left(B|X\right)\log\left(P\left(B|M, X\right)\right)$$

b. For training the regressor, for each sample, compute the regression target by weighing the smooth-L1 loss by the classification score:

$$Loss2_{loc}(C_1, C_2, X) = \sum_{x\in Pos_1}^{N} P_{Teacher}\left(C_1|X\right)\text{smooth}_{L1}\left(\Delta x_{Box,Pos_1} - \Delta x_{Pred}\right) + \sum_{x\in Pos_2}^{N} P_{Teacher}\left(C_2|X\right)\text{smooth}_{L1}\left(\Delta x_{Box,Pos_2} - \Delta x_{Pred}\right)$$

Here, X represents the anchor box associated to positive soft labels and Δx represents the difference between the soft label and the associated anchor box X. So a highly confident classification score will have more influence in optimizing the corresponding regression loss (smooth$_{L1}$ loss). A bounding box that does not have a high confidence $C_1$ or $C_2$ box will be most likely a background and will not have any significant influence on the regression function.

The combined loss is α*Loss1+(1−α)*Loss2, where α is used to control the weights of the combined loss and, in an embodiment, is set to 0.25. Note that any amount of representative unlabeled data can also be used to train a student model from the teacher models $M_1$ and $M_2$. There, only the Loss2 term is employed, as there are only soft labels from the models, and no hard labels as used in the Loss1 term.

Referring next to FIG. 3B, there is shown therein a generalized and expanded approach to the teacher-student optimization process of FIG. 3A. In FIG. 3B, models $M_1$, $M_2$ through $M_N$ comprise N teacher models 325, 330 and 335, each of which is trained with unlabeled data 320, and N labeled data sets $D_1$, $D_2$ through $D_N$, shown at 350, 355 and 360. The outputs of the models 325, 330 through 335, along with new unlabeled data 320 as well as data sets 350, 355 through 360 are all provided to the optimize process 365, where the loss terms for training the SSD are, as above, comprised of a loss term for the classifier and a term of the regressor where each of those terms is analogous to that discussed in connection with FIGS. 2 and 3A.

Referring next to FIG. 4, the active learning function, shown as process 145 in FIGS. 1 and 2 and implemented in some embodiments of the invention, can be better appreciated. Data labeling is important but very time consuming for operators. The active learning aspect of the present invention enables operators to build a model with the least volume of labeled data. In an embodiment, an operator labels a small random batch of the data and that small batch is then used to train an initial model. The resulting model is then used to create an uncertainty score for each of the remaining unlabeled data. In object detector training, the uncertainty score is defined as the average entropy of the anchor box classification $$UC_{score} = \frac{1}{N}\sum_{i=0}^{N-1}\sum_{j=0}^{C-1} -Pij\log(Pij)$$

The system organizes the unlabeled data according to each datum's uncertainty score, after which the operator is invited to label a batch of the unlabeled data having the highest uncertainty scores. The model is then retrained using all of the labeled data, yielding an improved result. This cyclic process of labeling, training and querying is continued until the model converges or the validation accuracy is deemed satisfactory by the user. By using active learning, the customers are able to train a model with high accuracy by only labeling a small subset of the raw data, for example as few as ten images for some models and as many as 1000 images or more for other models, based at least in part on the size of the dataset.

FIG. 4 illustrates the iterative approach described above, where a random sample of the image data, for example from 200A of FIG. 2, is labeled by an operator at 400, substantially as shown at 210 in FIG. 2. The labeled random sample of images is then provided at step 405 as training data (e.g., 250 in FIG. 2) and is used to train the deep learning network, step 410. The training results in an iteration of model 415, and the model 415 is run against the unlabeled images 420, such as the unlabeled images in data sets 200 and 205 where an uncertainty score is assigned to each image as described above. The images are organized by their uncertainty scores, 430, and at least a batch of those unlabeled images having the highest uncertainty scores (i.e., lowest certainty that the labeling is correct) is fed back to the operator to confirm or correct the labeling, including labeling a missed image, step

435. The number of images in the batch fed back to step 435 can be determined in any convenient manner, for example by using a preset number, or by assigning a threshold above which the image is returned for operator review and relabeling, empirically, or by any of a wide variety of other approaches. The size of the batch can also vary with the iteration, as the model converges. As better seen in FIG. 14B, where a queue of images is provided to the operator, those images for which further review is particularly suggested can be indicated by delineating a threshold in the user interface. In at least some embodiments, the model will converge to an acceptable accuracy where, for each iteration, the operator need only review and confirm or correct the labeling of those images above the threshold mark In some instances, the object is available physically but there are insufficient images of the object in context, i.e., with an appropriate background, to create a dataset adequate to train a model to yield sufficiently accurate results. In other cases, no physical example exists, but a 3D computer model is available. In such circumstances, the generation of synthetic images can offer a number of advantages. An embodiment of such an approach can be appreciated from FIG. 5, where a physical object or its computer model is available but out of context or in insufficient examples of context. If a physical example of the object of interest 500 is available, the object can be scanned in various ways, including LiDAR and appropriate post-processing, 510, a visible light image scan plus SLAM (Simultaneous localization and mapping) processing, 515, or a time-of-flight (ToF) generated model, 520. The scan of the object, which can be created by a combination of any of these approaches, results in the object's 3D geometry and surface textures and colors, 525. Alternatively, if no physical example of the object exists, but a CAD model either exists or can be created, 530, that, too, can yield the object's details.

The details of the object are then provided from 525 to a blending process, 535, which also receives data representative of at least color, tone, texture and scale of the scene depicted in a background image, 540, as well as characterizing information specifying position and angle of view of a virtual camera, 545, together with characteristics of the virtual camera such as distortion, foreshortening, compression, etc. The virtual camera can be defined by any suitable digital representation of a model of camera. The process 535 modifies the object in accordance with the context of the background image, including color and texture matching as well as scaling the object to be consistent with its location in the background image, and adjusts the image of the object by warping, horizontally or vertically tilting the object, and other similar photo post-processing techniques to give the synthetic representation of the object proper scale, perspective, distortion representative of the camera lens, noise, and related camera characteristics. The blended and scaled object image from step 555 is then provided to a renderer 560 which places the blended and scaled object into the background image. To achieve that result, the renderer 560 also receives the background image 540 and the camera information, 545 and 550. The result is a synthetic image 565 of the object in the background image, usable in dataset 200 of FIG. 2. The process of FIG. 5 can be repeated as many times as necessary to generate a complete but synthetic image dataset, where each image is different as the result of a changed background image, a different angle of view, a different camera position, etc. However, unlike non-synthetic images, in synthetic images the location of the object is known, and thus the labeling step of FIG. 2 can be performed automatically rather than requiring any action by a human operator. This permits fully automatic operation of at least the initial training of the system of FIG. 2, and in some instances eliminates the need for either machine assisted labeling and active learning, although verification that the production data has been properly labeled may still benefit from review by a human operator.

Figure 6A:
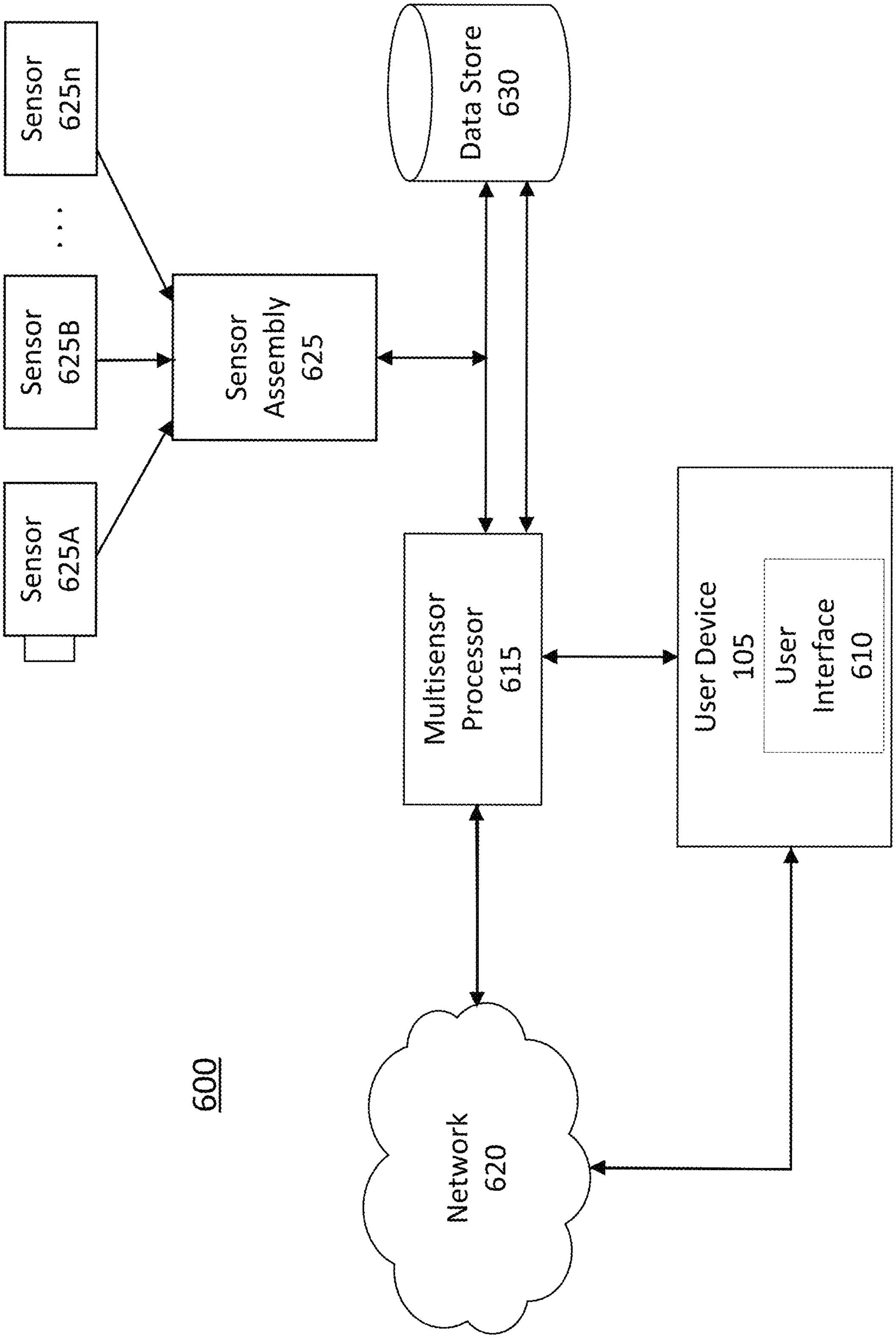
FIG. 6A shows in generalized block diagram form an embodiment of the overall system as a whole comprising the various inventions disclosed herein.

Referring next to FIG. 6A, shown therein is a generalized view of an embodiment of a system 600 that executes the various processes that, together, comprise the various inventive aspects described herein. In such an embodiment, the system 600 comprises a user device 605 having a user interface 610. A user of the system communicates with a multisensor processor 615 either directly or through a network connection which can be a local network, the internet, a private cloud or any other suitable network. The multisensory processor, described in greater detail in connection with FIG. 6B, receives input from and communicates instructions to a sensor assembly 625 which further comprises sensors 625A-625*n*. The sensor assembly can also provide sensor input to a data store 630, and in some embodiments can communicate bidirectionally with the data store 630.

Figure 6B:
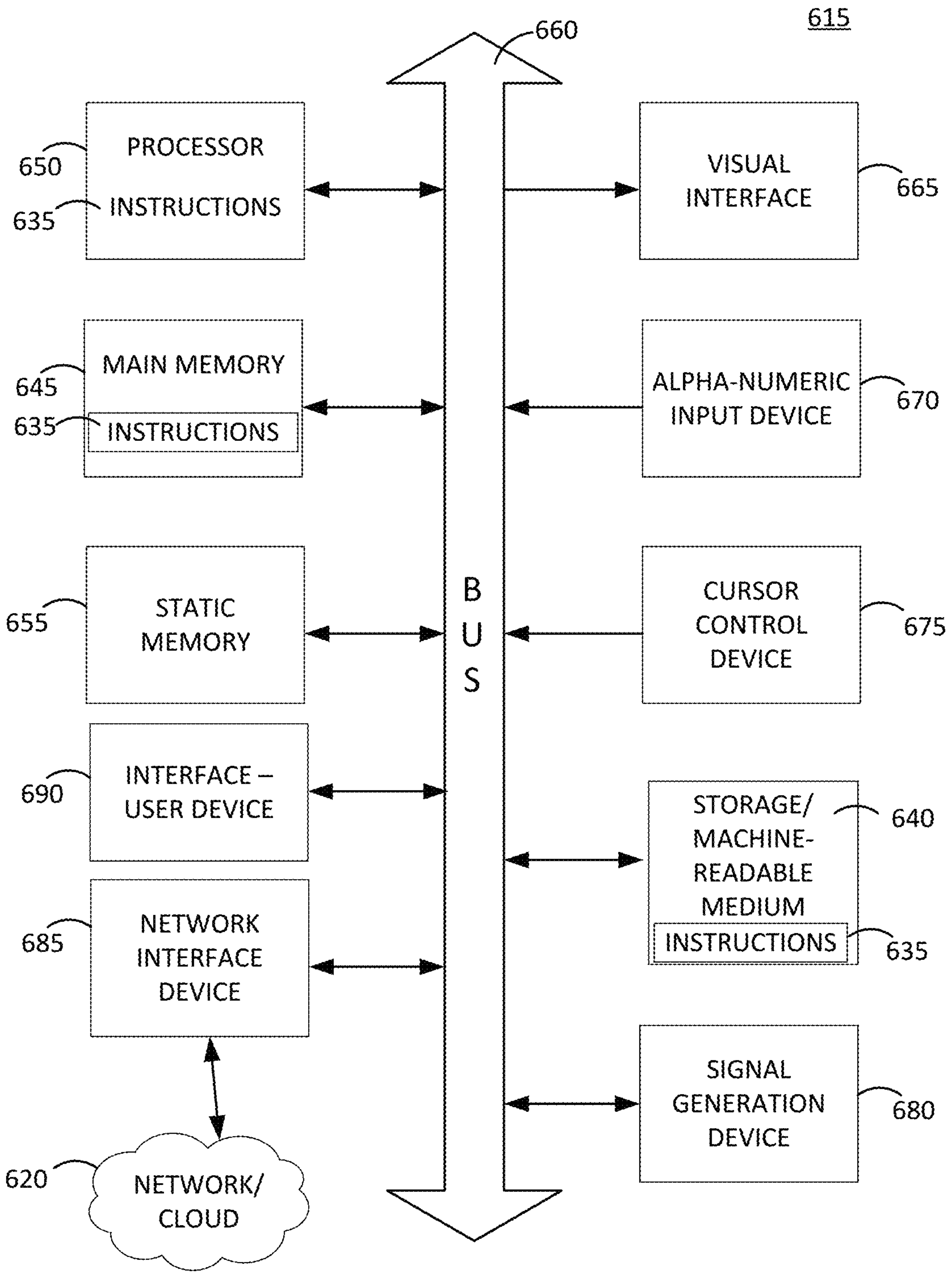
FIG. 6B illustrates in circuit block diagram form an embodiment of a system suited to host a neural network and perform the various processes of the inventions described herein.

Next with reference to FIG. 6B, shown therein in block diagram form is an embodiment of the multisensor processor system or machine 615 suitable for executing the processes and methods of the present invention. In particular, the processor 615 of FIG. 6B is a computer system that can read instructions 635 from a machine-readable medium or storage unit 640 into main memory 645 and execute them in one or more processors 650. Instructions 635, which comprise program code or software, cause the machine 615 to perform any one or more of the methodologies discussed herein. In alternative embodiments, the machine 615 operates as a standalone device or may be connected to other machines via a network or other suitable architecture. In a networked deployment, the machine may operate in the capacity of a server machine or a client machine in a server-client network environment, or as a peer machine in a peer-to-peer (or distributed) network environment. In some embodiments, system 600 is architected to run on a network, for example, a cloud network (e.g., AWS) or an on-premise data center network. Depending upon the embodiment, the application of the present invention can be web-based, i.e., accessed from a browser, or can be a native application.

The multisensor processor 615 can be a server computer such as maintained on premises or in a cloud network, a client computer, a personal computer (PC), a tablet PC, a set-top box (STB), a personal digital assistant (PDA), a cellular telephone, a smartphone, a web appliance, a network router, switch or bridge, or any machine capable of executing instructions 635 (sequential or otherwise) that specify actions to be taken by that machine. Further, while only a single machine is illustrated, the term "machine" is to be understood to include any collection of machines that individually or jointly execute instructions 635 to perform any one or more of the methods or processes discussed herein.

In at least some embodiments, the multisensor processor 615 comprises one or more processors 650. Each processor of the one or more processors 650 can comprise a central processing unit (CPU), a graphics processing unit (GPU), a digital signal processor (DSP), a controller, one or more application specific integrated circuits (ASICs), one or more radio-frequency integrated circuits (RFICs), or any combination of these. In an embodiment, the machine 615 further comprises static memory 655 together with main memory 645, which are configured to communicate with each other via bus 660. The machine 615 can further include one or more visual displays as well as associated interfaces, all indicated at 665, for displaying messages or data. The visual displays may be of any suitable type, such as monitors, head-up displays, windows, projectors, touch enabled devices, and so on. At least some embodiments further comprise an alphanumeric input device 670 such as a keyboard, touchpad or touchscreen or similar, together with a pointing or other cursor control device 675 such as a mouse, a trackball, a joystick, a motion sensor, a touchpad, a tablet, and so on), a storage unit or machine-readable medium 640 wherein the machine-readable instructions 635 are stored, a signal generation device 680 such as a speaker, and a network interface device 685. A user device interface 690 communicates bidirectionally with user devices 620 (FIG. 6A). In an embodiment, all of the foregoing are configured to communicate via the bus 660, which can further comprise a plurality of buses, including specialized buses, depending upon the particular implementation.

Although shown in FIG. 6B as residing in storage unit or machine-readable medium 640, instructions 635 (e.g., software) for causing the execution of any of the one or more of the methodologies, processes or functions described herein can also reside, completely or at least partially, within the main memory 645 or within the processor 650 (e.g., within a processor's cache memory) during execution thereof by the multisensor processor 615. In at least some embodiments, main memory 645 and processor 650 also can comprise, in part, machine-readable media. The instructions 635 (e.g., software) can also be transmitted or received over a network 620 via the network interface device 685.

While machine-readable medium or storage device 640 is shown in an example embodiment to be a single medium, the term "machine-readable medium" should be taken to include a single medium or multiple media (e.g., a centralized or distributed database, or associated caches and servers) able to store instructions (e.g., instructions 635). The term "machine-readable medium" includes any medium that is capable of storing instructions (e.g., instructions 635) for execution by the machine and that cause the machine to perform any one or more of the methodologies disclosed herein. The term "machine-readable medium" includes, but is not limited to, data repositories in the form of solid-state memories, optical media, and magnetic media. The storage device 640 can be the same device as data store 630 (FIG. 6A) or can be a separate device which communicates with data store 630.

Figure 7:
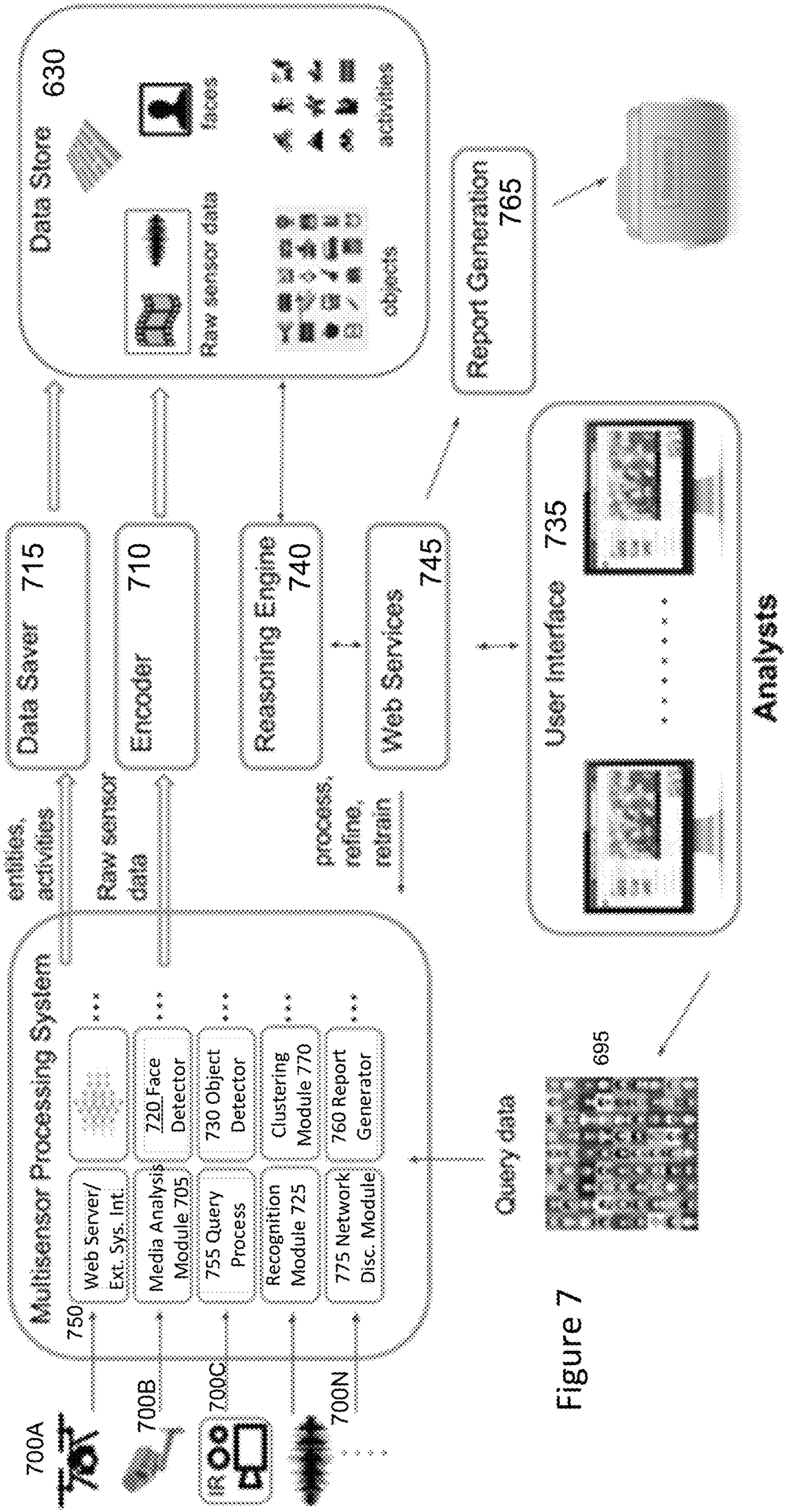
FIG. 7 illustrates in generalized flow diagram form an overall view of a system comprising various processes that may be accessed by an embodiment of at least some aspects of the invention.

FIG. 7 illustrates, at a high level, an embodiment of the software functionalities implemented in an exemplary system 600 shown generally in FIG. 6A, including an embodiment of those functionalities operating in the multisensor processor 615 shown in FIG. 6B. Thus, inputs 700A-700*n* can be video or other sensory input from a drone 700A, from a security camera 700B, a video camera 700C, or any of a wide variety of other input device 700*n* capable of providing data sufficient to at least assist in identifying an animate or inanimate object. It will be appreciated that combinations of different types of data can be used together for the analysis performed by the system. For example, in some embodiments, still frame imagery can be used in combination with video footage. In other embodiments, a series of still frame images can serve as the gallery. Still further, while organizing the input feed chronologically is perhaps the most common, arranging the input data either by lat/long or landmarks or relative position to other data sources, or numerous other methods, can also be used in the present invention. Further, the multisensor data can comprise live feed or previously recorded data. The data from the sensors 700A-700*n* is ingested by the processor 615 through a media analysis module 705. In addition to the software functionalities operating within the multisensor processor 615, described in more detail below, the system of FIG. 7 comprises encoders 710 that receive entities (such as faces and/or objects) and activities from the multisensor processor 615. Further, a data saver 715 receives raw sensor data from processor 615, although in some embodiments raw video data can be compressed using video encoding techniques such as H.264 or H.265. Both the encoders and the data saver provide their respective data to the data store 630 in the form of raw sensor data from data saver 710 and faces, objects, and activities from encoders 705. Where the sensor data is video, the raw sensor data can be compressed in either the encoders or the data saver using video encoding techniques, for example, H.264 & H.265 encoding.

Where the multisensor data from inputs 700A-700*n* includes full motion video from terrestrial or other sensors, the processor 615 can, in an embodiment, comprise a face detector 720 chained with a recognition module 725 which comprises an embedding extractor, and an object detector 730. In an embodiment, the face detector 720 and object detector 730 can employ a single shot multibox detector (SSD) network, which is a form of convolutional neural network. SSD's characteristically perform the tasks of object localization and classification in a single forward pass of the network, using a technique for bounding box regression such that the network both detects objects and also classifies those detected objects. Using, for example, the FaceNet neural network architecture, the face recognition module 725 represents each face with an "embedding", which is a 128-dimensional vector designed to capture the identity of the face, and to be invariant to nuisance factors such as viewing conditions, the person's age, glasses, hairstyle, etc. Alternatively, various other architectures, of which SphereFace is one example, can also be used. In embodiments having other types of sensors, other appropriate detectors and recognizers may be used. Machine learning algorithms may be applied to combine results from the various sensor types to improve detection and classification of the objects, e.g., faces or inanimate objects. In an embodiment, the embeddings of the faces and objects comprise at least part of the data saved by the data saver 710 and encoders 705 to the data store 630. The embedding and entities detections, as well as the raw data, can then be made available for querying, which can be performed in near real time or at some later time.

Queries to the data are initiated by analysts or other users through a user interface 735 which connects bidirectionally to a reasoning engine 740, typically through network 620 (FIG. 6A) via a web services interface 745, although in some embodiments the data is all local and the software application operates as a native app. In an embodiment, the web services interface 745 can also communicate with the modules of the processor 615, typically through a web services external system interface 750. The web services comprise the interface into the back-end system to allow users to interact with the system. In an embodiment, the web services use the Apache web services framework to host services that the user interface can call, although numerous other frameworks are known to those skilled in the art and are acceptable alternatives. Likewise, the system can be implemented in a local machine, which may include a GPU, so that queries from the UI and processing all execute on the same machine.

Queries are processed in the processor 615 by a query process 755. The user interface 735 allows querying of the multisensor data for faces and objects (collectively, entities) and activities. One exemplary query can be "Find all images in the data from multiple sensors where the person in a given photograph appears". Another example might be, "Did John Doe drive into the parking lot in a red car, meet Jane Doe, who handed him a bag". Alternatively, in an embodiment, a visual GUI can be helpful for constructing queries. The reasoning engine 740, which typically executes in processor 615, takes queries from the user interface via web services and quickly reasons through, or examines, the entity data in data store 630 to determine if there are entities or activities that match the analysis query. In an embodiment, the system geo-correlates the multisensor data to provide a comprehensive visualization of all relevant data in a single model. Once that visualization of the relevant data is complete, a report generator module 760 in the processor 615 saves the results of various queries and generates a report through the report generation step 765. In an embodiment, the report can also include any related analysis or other data that the user has input into the system.

The data saver 715 receives output from the processing system and saves the data on the data store 630, although in some embodiments the functions may be integrated. In an embodiment, the data from processing is stored in a columnar data storage format, such as Parquet as just one example, that can be loaded by the search backend and searched for specific embeddings or object types quickly. The search data can be stored in the cloud (e.g. AWS S3), on premise using HDFS (Hadoop Distributed File System), NFS, or some other scalable storage. In some embodiments, web services 745 together with user interface (UI) 735 provide users such as analysts with access to the platform of the invention through a web-based interface. The web based interface provides a REST API to the UI. The web based interface, in turn, communicates with the various components with remote procedure calls implemented using Apache Thrift. This allows various components to be written in different languages.

In an embodiment, the UI is implemented using React and node.js, and is a fully featured client side application. The UI retrieves content from the various back-end components via REST calls to web service. The User Interface supports upload and processing of recorded or live data. The User Interface supports generation of query data by examining the recorded or live data. For example, in the case of video, it supports generation of face snippets from uploaded photograph or from live video, to be used for querying. Upon receiving results from the Reasoning Engine via the Web Service, the UI displays results on a webpage.

A user interface comprises another aspect of the present invention, and various screens of an embodiment of a user interface are shown in FIGS. 8-15. In particular, FIG. 8 shows an opening screen of a production system 800, typically the source of the system production model 150 and the system production model training data 260. As discussed above, in at least some embodiments the production system 800 is trained on a wide variety of classes of objects. Nevertheless, an operator may find it useful to identify an object that is not included among those for which the production system 800 has been trained. In such a circumstance, the screen of an embodiment of the user interface (sometimes "UI" hereinafter) shown in FIG. 8 permits the operator to "Add New Model", shown at 805. By clicking on that link, the embodiment of a user interface screen 900 shown in FIG. 9 appears. In that screen, a list of the existing detectors 905 is shown, to permit the avoidance of duplication. In an embodiment, parameters of each detector are shown, for example model accuracy 910, date the model was last deployed 915, and model creation date 920, although such a display can optionally comprise more or fewer such parameters depending upon the implementation.

If the operator decides that the existing models would not yield the desired results, the operator can click on "New", shown at 925, in which case in an embodiment a screen such as shown in FIG. 9 appears. The operator is then enabled to designate a new detector, 950. In a conventional manner, the operator can correct an error in designation by canceling, 960, but if the operator is satisfied then the new detector is created by clicking on "Create Detector" at 965. Upon creation of the new detector, a UI screen 1000 such as shown in FIG. 10 invites the operator to add an image set, e.g., image sets 200 and 205, either from an addressable drive 1005, which is indicated as local in FIG. 10 but can be local or remote, or from an existing dataset 1010, or both. This provides the collection of unlabeled images that can be labeled by the operator at step 210 (FIG. 2). However, before labeling can begin, the operator needs to define a new object, as shown in exemplary form in the UI screen 1100 of FIG. 11A, which opens once the image set chosen in FIG. 10 is loaded. Thus, for example, the image data set loaded in FIG. 10 may be named "Redball1" as shown at 1105. Parameters of the data set 1105 then appear on the screen at 1110, and can include, in an exemplary embodiment, the number of images in the dataset (73 for the example of Redball1), as well as the number that have been labeled and thus are ready to be used for training (zero in FIG. 11A since no labeling has yet occurred), and the number actually used for training (again zero at this stage).

The operator is invited to define a new object by clicking on "New Object", 1115, which causes, in an embodiment, the screen 1120 of FIG. 11B to be displayed to the operator. The new object is defined by the operator as shown at 1115, and for purposes of this example is designated "Redball". Also shown on the screen 1120 is a list 1155 of the objects that already are identified in the Production System (FIG. 8). The new object is added by clicking on the "Create Object" field, 1160, which brings up a screen such as the exemplary version 1200 shown in FIG. 12A. At this point, the image data set 1105 is available, and the new object 1115 is defined, so the operator is invited to begin labeling a random sample of the images in the dataset 1105 by clicking on "Label", shown at 1205, which, in an embodiment, brings up the screen shown in FIG. 12B.

Figure 12B:
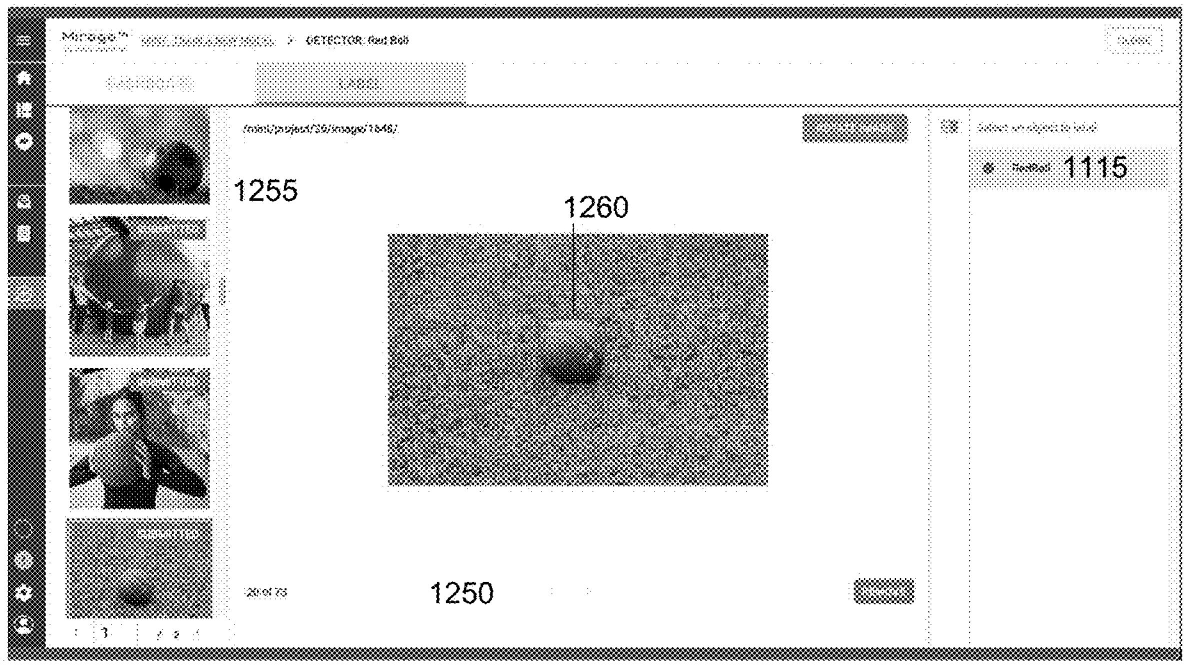
FIG. 12B shows an embodiment of screen of a user interface that enables labeling of detections of the new object of interest.

When the screen 1250 of FIG. 12B is displayed, the operator is presented with a queue of images as indicated generally at 1255. For each of the images that includes the object of interest, a "red ball" 1115 in this case, the operator encloses the object by forming a bounding box tightly around the object, as shown at 1260. Once each appearance of an object of interest in the image is enclosed in a box 1260, the image can be submitted for inclusion in the group of images used for initial training. Accuracy in such labeling is important, both to ensure that each instance of the object of interest is identified, and also to ensure that the boxes only enclose all or at least some portion of the object of interest. However, as discussed elsewhere herein, in embodiments which comprise in part one or both of machine labeling and active learning, the operator will be provided an opportunity to correct any labeling errors or omissions. Once a suitable number of images are labeled, where, as noted above, that number can vary depending on the particular object and model, the process advances to the screen of FIG. 13, indicated generally at 1300.

Figure 13:
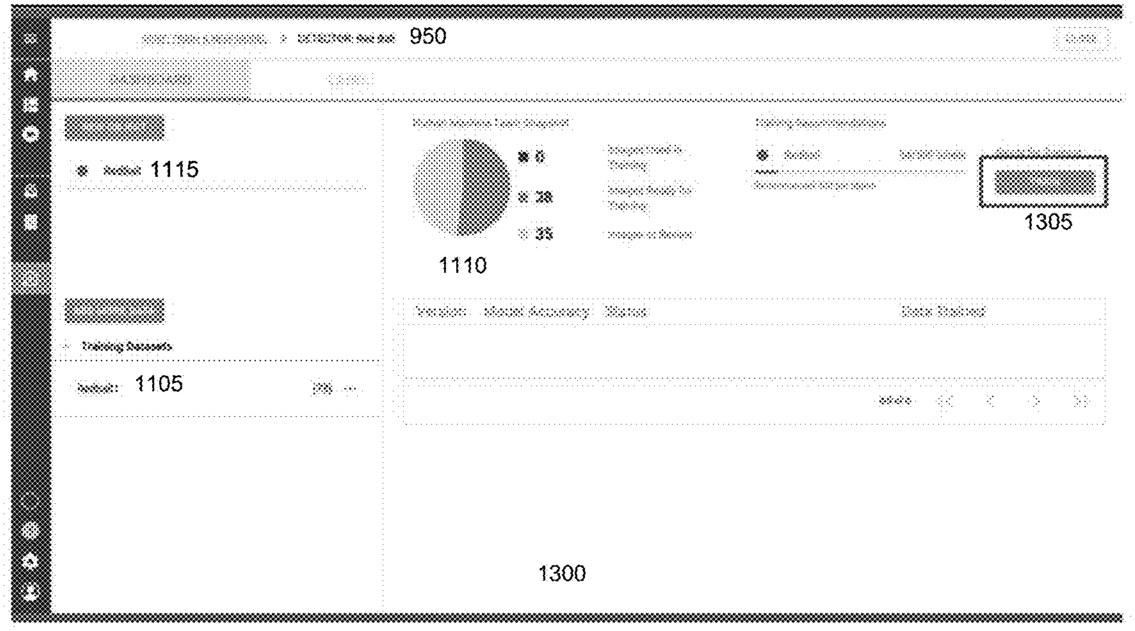
FIG. 13 shows an embodiment of a screen of a user interface that enables a user to initiate training of the new custom model.

In FIG. 13, the values at 1110 have changed from FIG. 12A, because now a number of images have been labeled and are available to begin training of the iterated model 130. Thus, in the example of FIG. 13, of the seventy-three images available, thirty-eight have been labeled, thirty-five remain unlabeled, and, so far, no images have been used in training. Training of the model 130 begins by clicking on the "Train" field 1305. This starts the training process described in FIGS. 1-4, above, including the optimize process 135, the machine-assisted process 140 and the active learning process 145. The result can be seen in FIG. 14A, denoted generally at 1400, which depicts an embodiment of a screen showing the results of a training iteration. In part, the results can be seen from the changes in the values at 1110, where now thirty-eight images have been used for training, none remain available for training, and, for the embodiment shown, seventeen have been fed back via step 170 for consideration by the operator. In other embodiments, the number of images for review can be the combination of the images that remained unlabeled after the labeling step, or thirty-five, plus the seventeen returned from step 170, yielding a total of fifty-two instead of seventeen. In at least some embodiments, the top of the queue of unlabeled images for which operator review is suggested will comprise the images received back from the machine-labeling and active learning processes 140 and 145, respectively. That queue of images can be better appreciated from the user interface screen shown in FIG. 14B and denoted generally at 1450, where the queue is indicated at 1455. Images with the highest uncertainty scores are at the top of the queue, where at 1460 a threshold is indicated. The threshold 1460 indicates that the operator is particularly invited to review the images above that threshold since those images have the highest uncertainty values. The labels proposed by the active learning and machine-assisted labeling process can be appreciated from an image 1465, shown in the queue 1455 and also in larger size, at the right in the embodiment of FIG. 14B, when selected for review. In the image 1465, some, though not all, of the objects are tightly enclosed by dashed boxes 1470, indicating that the label is a proposed label. As discussed hereinafter, any drawing style for the boxes 1470 is acceptable although preferably the boxes indicating proposed labels are readily distinguishable from boxes applied by the operator, or, as discussed below in connection with FIGS. 15A-15B, boxes indicating various levels of confidence that an image satisfies a query based on the new model. Referring still to FIG. 14B, the operator is invited to confirm the suggested labeling, either by clicking on the box or any other convenient form of selection. If the operator chooses to reject the selection, in an embodiment the selection can simply be ignored, or in other embodiments the specific box 1470 can be selected by a different selection process that indicates the proposed label is rejected, such as by a delete key as just one of many options. In instances where there is no pre-existing system production model, as discussed above, the foregoing process can be used to develop the system production model.

Depending upon the embodiment, the process of FIG. 2 iterates as the images in the queue 1455 of FIG. 14B as reviewed, although in other embodiments the next iteration is only performed after a batch of images is reviewed, with, as just one example, all of the images above the threshold 1460 being considered a batch. As noted above, the model converges with each such iteration. It will be appreciated by those skilled in the art that the model need not reach perfect accuracy to yield useful results. The combination of the iterative approach to training, the use of teacher-student optimization to create a merged model, and the recognition that perfect accuracy is not a requisite to achieving high quality results, means that the operator is required to review far fewer than the total number of images in the image dataset 200/205 to be able to be able to create custom models without the need for extensive training in labeling or other tasks that have historically been associated with deep learning detectors.

Once the model has been trained sufficiently, such that the merged model 155 (FIGS. 1, 2) can respond well to a query addressing the new object 1115, results of running the merged model against production data 165 will yield for review by the operator images that are responsive to such a query. The result of such an analysis for still images and video snippets from an exemplary embodiment can be seen in FIGS. 15A and 15B, respectively. In FIG. 15A, still frame images determined to be responsive to the query are shown in a queue at the left, where images determined to match the query with high confidence are shown at the top and indicated at 1510, images assigned medium confidence are located in the middle and indicated at 1515, and images with low confidence but still above a minimum confidence threshold are at the lower end of the queue and indicated at 1520. The confidence values 1525 associated with each image are shown to the right of the images, e.g., 96% for 1510, 67% and 61% for 1515, and 58% and 56% for 1520. Labels indicating the general level of confidence, e.g., high, medium, low, can be provided at the left of the queue, and color coded to permit rapid identification. While only three levels of confidence are shown in FIG. 15A, it will be appreciated that this is only exemplary and the number of levels is discretionary, including not having any levels at all and instead just indicating the confidence value for each image as shown at 1525. In an embodiment, images assigned a confidence value of at least 95% are assigned high confidence, images between 60% and 95% medium confidence and, below that, low confidence. A selected image, in this example the upper one of images 1515, is shown in greater detail in the center portion of FIG. 15A where it can be reviewed in detail by an operator. An optional timestamp 1530 can indicate when an image was taken, selected, or any other time-related characteristic and can serve as a sorting criteria, 1535. Across the bottom of the screen can be displayed a row of thumbnails 1540 or similar reduced-size images representative of each image that the system deemed responsive to the analysis. Each of these thumbnails can also be selected for review and disposition by an operator.

FIG. 15B provides an exemplary embodiment of a UI screen 1545 for displaying video snippets that result from the analysis described above. The snippets responsive to the analysis are shown at the left, indicated generally at 1550, with a selected snippet displayed in larger form 1555 at the center of the screen. In the illustrated embodiment, the length of each snippet is indicated alongside the snippet, and the confidence value associated with the snippet is also displayed. In some embodiments, the snippets are displayed in order of confidence level, usually in decreasing order but either or another suitable ordering can be implemented depending upon the context and the selected settings, accessed via settings icon 1560. The number of displayed snippets 1550 can vary by implementation. For the snippet selected for review and display at the center of the screen 1555, a timeline 1565 displays when during the snippet the object of interest was detected. Any of the displayed snippets 1555 can be selected by clicking on the representative image shown, and additional blocks or pages of snippets can be selected by clicking on numbered squares shown at 1570. In an embodiment, the snippets are selected from one or more datasources, where the one or more datasources being queried is indicated at 1575. Because a search over a large corpus of video data can return a large, unwieldy number of hits, paginating the results of a search can provide helpful organization of those results. As just one example, a page of snippets can represent fifty results or other suitable number, or the number of results can be permitted to vary according to similarity of confidence percentages, duration or other desired criteria.

To increase or decrease the number of detections, the confidence threshold can be adjusted to any desired level, for example by slider 1580, shown in FIG. 15B as being at 20% although the confidence value can be set higher or lower depending upon context, operator preference, or other suitable criteria. The context of the display can be varied by clicking on "eye" icon 1585, and can switch among several types of selections of the data to be displayed. Likewise, default confidence values can, in some embodiments, vary depending upon the criteria by which the data is selected for display. For example, in some embodiments, the confidence adjustment slider 1580 will appear by default when the "eye" icon is clicked to select an "Inspect" mode, but may not appear by default an "Analysis Results" mode, and may appear in "Live Monitoring Alerts" mode, with each of those defaults adjustable by user preference through the settings available at icon 1560.

The display of confidence percentages can also vary depending upon the selections of the data to be displayed to the operator. For example, in an embodiment of the Analysis Results display, confidence percentages are hidden by default in the video player, and by default also hidden for objects displayed in the larger view shown at 1555. At the same time, by default all detections exceeding a default low confidence threshold, for example one percent, may be returned as search results, optionally arranged by confidence percentage. In contrast, the defaults for Live Monitoring Alerts may be, for example, to return all detections above a default threshold of 20% confidence, with confidence percentages always visible. As noted above, the default values can be adjusted via the settings accessible at icon 1560.

In an embodiment, "inspect" mode reveals to the operator all detections of any searched object or objects above a default confidence level, for example 20%, with the identities of the searched objects visible at 1590. Optionally, the user can be permitted to select which of the objects shown at 1590 are revealed in inspect mode, surrounded by their respective bounding boxes. Again, the confidence threshold can be adjusted in at least some embodiments. Alternatively, inspect mode can also be configured to reveal all objects detected by the system, whether or not a given object is part of the analysis results, or can be configured to allow the operator to incrementally add types or classes of objects that the system will reveal in inspect mode. Inspect mode can thus be used by an operator to reveal associations between or among detected objects, where the types of detections to be revealed varies with each iteration of a search. Inspect mode can also be use for verification step, to ensure that they system is successfully detecting all objects in a frame or a video sequence regardless whether included in a given search. In any of the modes a given scene can be captured by clicking on "capture scene", shown at 1595.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A method for developing in one or more processors a merged machine learned model for classification and detection of one or more previously specified objects and at least one newly specified object comprising providing in one or more processors and associated storage a system production model comprising a first machine learned model capable of detecting and classifying one or more previously specified objects identified through the use of at least some anchor bounding boxes, providing in one or more processors and associated storage an iterated model comprising a second machine learned model capable, following training, of detecting and classifying at least one newly specified object, providing to the system production model and the iterated model a system production training dataset representative of the previously specified objects, providing to the system production model and the iterated model a second training dataset representative of a newly specified object identified through the use of at least some bounding boxes, processing, in both the system production model and the iterated model, at least the system production dataset and the second training dataset and generating a system training output and an iterated training output, respectively, optimizing the system and iterated training outputs from the processing step by applying classification and regression algorithms to the system training output and the iterated training output to generate an optimized training output, supplying the optimized training output as the merged machine learned model configured to classify and detect at least some of the one or more previously specified objects and at least one of the newly specified objects.

2. The method of claim 1 wherein new unlabeled data is supplied to the system production model, the iterated model, and the optimizing step and the processing step includes processing the new unlabeled data.

3. The method of claim 1 wherein at least one of the system production model and the iterated model is a single shot multibox detector.

4. The method of claim 1 wherein classification comprises determining the probability distribution of the presence of any of the objects of interest, or the background, at an anchor box.

5. The method of claim 1 wherein classification is modeled as a softmax function to output confidence of a foreground class or a background class.

6. The method of claim 1 wherein regression is modeled as a non-linear multivariate regression function.

7. The method of claim 6 wherein the multivariate regression function outputs a four-dimensional vector representing center coordinates, width and height of the bounding box enclosing the object in the image.

8. The method of claim 1 wherein the second training dataset is only partly labeled.

9. The method of claim 1 wherein the system production model is interoperable with the iterated model.

10. The method of claim 1 wherein at least the second training dataset comprises at least in part synthetic data.

11. The method of claim 1 wherein at least one of the first and second machine learned models is selected from a group comprising a single shot multibox detector and a low shot learning detector.

12. The method of claim 1 wherein the system training output is provided to an operator for correction and the corrected output is processed in a second iteration of the processing step.

13. The method of claim 1 comprising the further step of providing a validation dataset to the system production model and the iterated model.

14. The method of claim 1 in which the iterated model comprises a plurality of iterated models, each comprising a second machine learned model capable, following training, of detecting and classifying at least one newly specified object.

15. The method of claim 1 wherein at least the second training dataset comprises in part video snippets.

16. The method of claim 1 wherein only part of the second training dataset is labeled.

17. A system for developing a merged machine learned model for classification and detection of one or more previously specified objects and at least one newly specified object comprising one or more processors and associated storage coupled to the one or more processors and having stored therein instructions executable by the processors wherein the instructions when executed comprise a first machine learned model configured as a system production model capable of detecting and classifying one or more previously specified objects identified through the use of at least some anchor bounding boxes, a second machine learned model configured as an iterated model capable, following training, of detecting and classifying at least one newly specified object, a system production training dataset representative of the previously specified objects and a second training dataset representative of a newly specified object identified through the use of at least some bounding boxes, the processors being operable when executing the instructions to process, in both the system production model and the iterated model, at least the system production dataset and the second training dataset, to generate a system training output and an iterated training output, respectively, to optimize the system training output and the iterated training output by applying classification and regression algorithms to the system training output and the iterated training output to generate an optimized training output, and to supply the optimized training output as the merged machine learned model configured to classify and detect at least some of the one or more previously specified objects and at least one of the newly specified objects.

18. The system of claim 17 wherein at least one of the first and second machine learned models is selected from a group comprising a single shot multibox detector and a low shot learning detector.

19. The system of claim 17 in which the second machine learned mode comprises a plurality of iterated models, each capable, following training, of detecting and classifying at least one newly specified object.

20. The system of claim 17 wherein new unlabeled data is processed in both the system production model and the iterated model.

21. The system of claim 17 wherein the system training output is provided to an operator for correction and the instructions cause the processor to reiterate execution of the process including the corrected output.

22. The system of claim 17 where at least the second training dataset comprises in part video snippets.

23. One or more computer-readable non-transitory storage media embodying software that is operable when executed to:

provide a system production model comprising a first machine learned model capable of detecting and classifying one or more previously specified objects identified through the use of at least some anchor bounding boxes, provide an iterated model comprising a second machine learned model capable, following training, of detecting and classifying at least one newly specified object, provide a system production training dataset representative of the previously specified objects to the system production model and the iterated model, provide a second training dataset representative of a newly specified object identified through the use of at least some bounding boxes to the system production model and the iterated model, process, in both the system production model and the iterated model, at least the system production dataset and the second training dataset and generate a system training output and an iterated training output, respectively, optimize the system training output and the iterated training output by applying classification and regression algorithms to the system training output and the iterated training output to generate an optimized training output, supply the optimized training output as the merged machine learned model configured to classify and detect at least some of the one or more previously specified objects and at least one of the newly specified objects.

24. The storage media of claim 23 wherein the second training dataset comprises at least in part video snippets.

25. The storage media of claim 23 wherein the second training dataset comprises at least in part synthetic data.

26. The storage media of claim 23 wherein classification is modeled as a softmax function to output confidence of a foreground class or a background class.

27. The storage media of claim 23 wherein regression is modeled as a non-linear multivariate regression function.

28. The storage media of claim 27 wherein the multivariate regression function outputs a four-dimensional vector representing center coordinates, width and height of the bounding box enclosing the object in the image.

* * * * *